(12) United States Patent
Abou Gazala et al.

(10) Patent No.: US 9,798,574 B2
(45) Date of Patent: Oct. 24, 2017

(54) TECHNIQUES TO COMPOSE MEMORY RESOURCES ACROSS DEVICES

(71) Applicant: INTEL CORPORATION, Santa Clara, CA (US)

(72) Inventors: Neven M Abou Gazala, Kirkland, WA (US); Paul S. Diefenbaugh, Portland, OR (US); Nithyananda S. Jeganathan, Portland, OR (US); Eugene Gorbatov, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 258 days.

(21) Appl. No.: 14/129,530

(22) PCT Filed: Sep. 27, 2013

(86) PCT No.: PCT/US2013/062310
§ 371 (c)(1),
(2) Date: Dec. 26, 2013

(87) PCT Pub. No.: WO2015/047314
PCT Pub. Date: Apr. 2, 2015

(65) Prior Publication Data
US 2015/0095598 A1 Apr. 2, 2015

(51) Int. Cl.
*G06F 3/06* (2006.01)
*G06F 9/46* (2006.01)
(Continued)

(52) U.S. Cl.
CPC ............ *G06F 9/46* (2013.01); *G06F 12/0868* (2013.01); *G06F 12/0804* (2013.01);
(Continued)

(58) Field of Classification Search
CPC ............ G06F 12/0804; G06F 12/0868; G06F 2212/1016; G06F 2212/286; G06F 9/46
See application file for complete search history.

(56) References Cited

U.S. PATENT DOCUMENTS 6,981,096 B1   12/2005 Matick et al.
2002/0062413 A1   5/2002 Nishikawa et al.
(Continued)

OTHER PUBLICATIONS

International Search Report and Written Opinion received for PCT Patent Application No. PCT/US2013/062310, mailed Jun. 23, 2014, 12 pages.
(Continued)

*Primary Examiner* — Ann J Lo
*Assistant Examiner* — Jane Wei

(57) ABSTRACT

Examples are disclosed for composing memory resources across devices. In some examples, memory resources associated with executing one or more applications by circuitry at two separate devices may be composed across the two devices. The circuitry may be capable of executing the one or more applications using a two-level memory (2LM) architecture including a near memory and a far memory. In some examples, the near memory may include near memories separately located at the two devices and a far memory located at one of the two devices. The far memory may be used to migrate one or more copies of memory content between the separately located near memories in a manner transparent to an operating system for the first device or the second device. Other examples are described and claimed.

20 Claims, 14 Drawing Sheets

(51) Int. Cl.
    G06F 12/0868    (2016.01)
    G06F 12/0804    (2016.01)
(52) U.S. Cl.
    CPC .......... G06F 2212/1016 (2013.01); G06F 2212/286 (2013.01); Y02B 60/1225 (2013.01)

(56) References Cited

U.S. PATENT DOCUMENTS

| | | | |
|---|---|---|---|
| 2004/0064648 A1* | 4/2004 | Brown | G06F 12/0862 711/137 |
| 2004/0759489 | 9/2004 | Hooker | |
| 2005/0278559 A1 | 12/2005 | Sutardja et al. | |
| 2006/0294304 A1* | 12/2006 | Brown | G06F 12/126 711/115 |
| 2008/0263282 A1 | 10/2008 | Harada et al. | |
| 2010/0172180 A1 | 7/2010 | Paley et al. | |
| 2010/0185821 A1* | 7/2010 | Paver | G06F 12/0831 711/146 |
| 2010/0228922 A1* | 9/2010 | Limaye | G06F 12/0897 711/135 |
| 2011/0191534 A1* | 8/2011 | Ash | G06F 12/0804 711/113 |
| 2011/0213993 A1 | 9/2011 | Greenhalgh | |
| 2012/0166891 A1 | 6/2012 | Dahlen et al. | |
| 2012/0198166 A1 | 8/2012 | Damodaran et al. | |
| 2013/0046935 A1* | 2/2013 | Ramanathan | G06F 17/30132 711/119 |
| 2013/0086200 A1 | 4/2013 | Alanis et al. | |
| 2013/0219125 A1* | 8/2013 | Kusters | G06F 12/127 711/136 |
| 2013/0268728 A1 | 10/2013 | Ramanujan et al. | |
| 2014/0040550 A1 | 2/2014 | Nale et al. | |
| 2014/0040552 A1* | 2/2014 | Rychlik | G06F 12/0815 711/122 |

OTHER PUBLICATIONS

Taiwan IPO Search Report received for Taiwanese Patent Application No. 103132992, mailed Jul. 29, 2015, 1 page.
Extended European Search Report received for European patent Application No. 13894905.2, dated Apr. 25, 2017, 7 pages.
Office Action received for Japanese Patent Application No. 2016-538904, dated Mar. 7, 2017, 14 pages including 8 pages English translation.

* cited by examiner

Storage Medium 1000

*Computer Executable Instructions for 900*

DETECTING, AT A FIRST DEVICE HAVING FIRST CIRCUITRY, AN INDICATION THAT A SECOND DEVICE HAVING SECOND CIRCUITRY HAS CONNECTED TO THE FIRST DEVICE, THE FIRST AND THE SECOND CIRCUITRY EACH CAPABLE OF EXECUTING ONE OR MORE APPLICATIONS USING A 2LM ARCHITECTURE HAVING A NEAR MEMORY AND A FAR MEMORY
*1202*

RECEIVE, FROM A FIRST FAR MEMORY LOCATED AT THE SECOND DEVICE, A COPY OF MEMORY CONTENTS FROM A SECOND NEAR MEMORY LOCATED AT THE SECOND DEVICE, THE MEMORY CONTENTS USED BY THE SECOND CIRCUITRY TO EXECUTE THE ONE OR MORE APPLICATIONS
*1204*

STORE THE COPY OF MEMORY CONTENTS TO A FIRST NEAR MEMORY LOCATED AT THE FIRST DEVICE IN A MANNER TRANSPARENT TO N OS FOR THE FIRST OR THE SECOND DEVICE, THE COPY OF MEMORY CONTENTS STORED TO THE FIRST NEAR MEMORY FOR USE BY THE FIRST CIRCUITRY TO EXECUTE THE ONE OR MORE APPLICATIONS
*1206*

SEND FROM THE FIRST NEAR MEMORY AT LEAST PORTION OF MEMORY CONTENT TO THE FIRST FAR MEMORY LOCATED AT THE SECOND DEVICE, THE AT LEAST PORTION OF MEMORY CONTENT TO INCLUDE ONE OR MORE DIRTY PAGES GENERATED DURING EXECUTION OF THE ONE OR MORE APPLICATIONS BY THE FIRST CIRCUITRY
*1208*

RECEIVE A PAGE MISS INDICATION FOR THE FIRST NEAR MEMORY, THE PAGE MISS ASSOCIATED WITH DATA MAINTAINED IN THE FIRST FAR MEMORY
*1210*

SEND A MEMORY ACCESS REQUEST TO THE SECOND DEVICE TO OBTAIN THE DATA MAINTAINED IN THE FIRST FAR MEMORY
*1212*

RECEIVE THE DATA FROM THE FIRST FAR MEMORY
*1214*

STORE THE DATA IN THE FIRST MEMORY
*1216*

FIG. 12

Storage Medium *1300*

Computer Executable Instructions for *1200*

*FIG. 13*

TECHNIQUES TO COMPOSE MEMORY RESOURCES ACROSS DEVICES

TECHNICAL FIELD

Examples described herein are generally related to aggregating resources across computing devices.

BACKGROUND

Computing devices in various form factors are being developed that include increasing amounts of computing power, networking capabilities and memory/storage capacities. Some form factors attempt to be small and/or light enough to actually be worn by a user. For example, eyewear, wrist bands, necklaces or other types of wearable form factors are being considered as possible form factors for computing devices. Additionally, mobile form factors such as smart phones or tablets have greatly increased computing and networking capabilities and their use has grown exponentially over recent years.

BRIEF DESCRIPTION OF THE DRAWINGS

FIG. 10 illustrates an example of a first storage medium.
FIG. 12 illustrates an example of a second logic flow.
FIG. 13 illustrates an example of a second storage medium.

DETAILED DESCRIPTION

Figure 1:
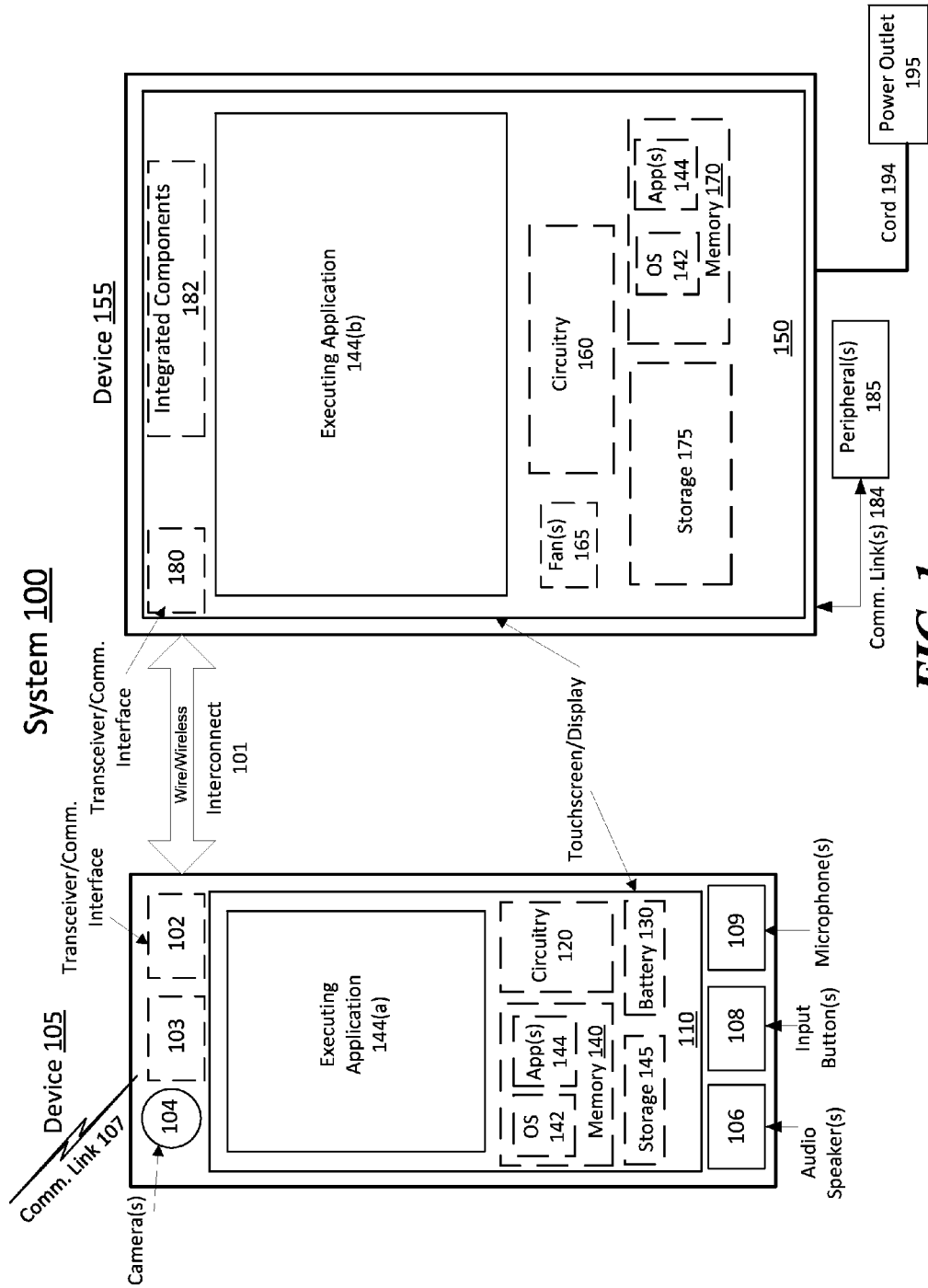
FIG. 1 illustrates an example of a first system.

Examples are generally directed to improvements for aggregating compute, memory and input/output (I/O) resources across devices. Aggregation across devices such as computing devices may be influenced by possibly utilizing multiple computing devices that may each have different functionality and/or capabilities. For example, some computing devices may be small enough for a user to actually wear the computing device. Other types of small form factor computing devices may include smart phones or tablets where size/weight and a long battery life are desirable traits for users of these devices. Hence, wearable, smart phone or tablet computing devices may each be relatively light weight and may use low amounts of power to extend battery life. Yet users may expect greater computational capabilities that may not be possible in these small form factors.

Other types of computing devices may be somewhat stationary and may therefore have a larger form factor that is powered by a fixed power source or a comparatively larger battery compared to wearable, smart phone or tablet computing devices. These other computing devices may include desktop computers, laptops, or all-in-one computers having an integrated, large format (e.g., greater than 15 inches) display. The large form factor of these other devices and the use of a fixed power source (e.g., via a power outlet) or a large battery power source may allow for to considerably more computing, memory or I/O resources to be included with or attached to these form factors. In particular, a higher thermal capacity associated with a larger form factor along with possible use of active cooling (e.g., via one or more fans) may allow for the considerably more computing, memory or I/O resources as compared to smaller form factors.

In contrast, wearable, smart phone or tablet computing devices, as mentioned are in relatively small form factors that depend on battery power and likely do not have active cooling capabilities. Also, power circuitry and use of a battery may reduce current-carrying capacity of these types of devices. A reduced current-carrying capacity may restrict types of potentially powerful computing resources from being implemented in these smaller form factors. Further, higher costs and/or space constraints may result in relatively low amounts of some types of memory resources such as double data rate synchronous dynamic random-access memory (DDR SRAM) memory.

Aggregation of memory resources across computing devices having different memory capabilities may be a desirable objective. Current attempts to aggregate memory resources across computing devices have relied primarily on software implementations. These types of software implementations usually result in high latencies and degraded user experience. For example, user-perceptible delays associated with software implementations may result when streaming high-definition video or gaming information between aggregating devices such as a smart phone and an all-in-one computer. The user-perceptible delays may result in a choppy or stalled video as memory resources are aggregated between the devices. Thus a seamless aggregation of memory resources across multiple computing devices may be problematic when relying primarily on software implementations for the aggregation. It is with respect to these and other challenges that the examples described herein are needed.

According to some examples, example first methods may be implemented at a first device (source device) having a first circuitry, e.g., processing element(s) and/or graphic engine(s). For these examples, the first circuitry may be capable of executing one or more applications using a two-level memory (2LM) architecture or scheme that includes a first near and a second far memory. For these examples, a second device (target device) having second circuitry may be detected. The second circuitry may be capable of executing the one or more applications using the 2LM architecture that also includes a second near memory. Logic and/or features at the source device may cause the source device to connect to the target device, e.g., via a wired or a wireless interconnect. The logic and/or features may utilize the first far memory to migrate a copy of memory contents from the first near memory to the second near memory. According to these first example methods, utilization of the first far memory to migrate the copy of memory contents to the second near memory may enable the logic and/or features to migrate the memory contents in a manner that is transparent to an operating system (OS) for the source device or the target device.

In some other examples, example second methods may be implemented at a first device (target device) having a first circuitry capable of executing one or more applications using a 2LM architecture having a first near and a first far memory. For these example second methods, a second device (source device) having second circuitry capable of executing the one or more applications using the 2LM architecture that also includes a second near memory at the source device may be detected as being connected to the target device. Logic and/or features at the target device may be capable of receiving, from the first far memory, a copy of memory contents from the second near memory. The memory contents may have been used by the second circuitry to execute the one or more applications. The logic and/or features may store the copy of memory contents to the first near memory in a manner transparent to an OS for the target or the source device. The memory contents stored to the first near memory may be then be used by the first circuitry to execute the one or more applications.

FIG. 1 illustrates an example first system. In some examples, the example first system includes system 100. System 100, as shown in FIG. 1, includes a device 105 and a device 155.

According to some examples, devices 105 and 155 may represent two examples of different form factors for computing devices. As described more below, device 105 may be a smaller form factor that may operate primarily off battery power while device 155 may be a relatively larger form factor that may operate primarily off a fixed power source such as an alternating current (A/C) received via a power outlet associated, for example, with power purchased from a power utility.

In some examples, device 105 is shown in FIG. 1 as observed from a front side that may correspond to a side of device 105 that includes a touchscreen/display 110 that may present a view of executing application(s) 144(a) to a user of device 105. Similarly, device 155 is shown in FIG. 1 as observed from a front side that includes a touchscreen/display 150 that may present a view of executing application 144(b) to a user of device 155. Although, in some examples, a display may also exist on back side of device 105 or device 155, for ease of explanation, FIG. 1 does not include a back side display for either device.

According to some examples, the front side views of devices 105 and 155 include elements/features that may be at least partially visible to a user when viewing these devices from a front view. Also, some elements/features may not be visible to the user when viewing devices 105 or 155 from a front side view. For these examples, solid-lined boxes may represent those features that may be at least partially visible and dashed-line boxes may represent those element/features that may not be visible to the user (e.g., underneath a skin or cover). For example, transceiver/communication (comm.)) interfaces 102 and 180 may not be visible to the user, yet at least a portion of camera(s) 104, audio speaker(s) 106, input button(s) 108, microphone(s) 109 or touchscreen/display 110 may be visible to the user.

According to some examples, as shown in FIG. 1, a comm. link 107 may wirelessly couple device 100 via network interface 103. For these examples, network interface 103 may be configured and/or capable of operating in compliance with one or more wireless communication standards to establish a network connection with a network (not shown) via comm. link 107. The network connection may enable device 105 to receive/transmit data and/or enable voice communications through the network.

In some examples, various elements/features of device 105 may be capable of providing sensor information associated with detected input commands (e.g., user gestures or audio command). For example, touch screen/display 110 may detect touch gestures. Camera(s) 104 may detect spatial/air gestures or pattern/object recognition. Microphone(s) 109 may detect audio commands. In some examples, a detected input command may be to affect executing application 144(a) and may be interpreted as a natural UI input event. Although not shown in FIG. 1 a physical keyboard or keypad may also receive input command that may affect executing application(s) 144(a).

According to some examples, as shown in FIG. 1, device 105 may include circuitry 120, a battery 130, a memory 140 and a storage 145. Circuitry 120 may include one or more processing elements and graphic engines capable of executing App(s) 144 at least temporarily maintained in memory 140. Also, circuitry 120 may be capable of executing operating system (OS) 142 which may also be at least temporarily maintained in memory 140.

In some examples, as shown in FIG. 1, device 155 may include circuitry 160, storage 175, memory 170 and transceiver/comm. interface 180. Device 155 may also include fan(s) 165 which may provide active cooling to components of device 155. Also, as shown in FIG. 1, device 155 may include integrated components 182. Integrated components 182 may include various I/O devices such as, but not limited to, cameras, microphones, speakers or sensors that may be integrated with device 155.

According to some examples, as shown in FIG. 1, device 155 may be coupled to a power outlet 195 via a cord 194. For these examples, device 155 may receive a fixed source of power (e.g., A/C power) via the coupling to power outlet 195 via cord 194.

In some examples, as shown in FIG. 1, device 155 may couple to peripheral(s) 185 via comm. link 184. For these examples, peripheral(s) 185 may include, but are not limited to, monitors, displays, external storage devices, speakers, microphones, game controllers, cameras, I/O input devices such as a keyboard, a mouse, a trackball or stylus.

According to some examples, logic and/or features of device 105 may be capable of detecting device 155. For example, transceiver/comm. interfaces 102 and 180 may each include wired and/or wireless interfaces that may enable device 105 to establish a wired/wireless communication channel to connect with device 155 via interconnect 101. In some examples, device 105 may physically connect to a wired interface (e.g., in docking station or a dongle) coupled to device 155. In other examples, device 105 may come within a given physical proximity that may enable device 105 to establish a wireless connection such as a wireless docking with device 155. Responsive to the wired or wireless connection, information may be exchanged that may enable device 105 to detect device 155 and also to determine at least some capabilities of device 155 such as circuitry available for executing App(s) 144.

In some examples wired and/or wireless interfaces included in transceiver/comm. interfaces 102 and 180 may operate in compliance with one or more low latency, high bandwidth and efficient interconnect technologies. Wired interconnect technologies may include, but are not limited to, those associated with industry standards or specifications (including progenies or variants) to include the Peripheral Component Interconnect (PCI) Express Base Specification, revision 3.0, published in November 2010 ("PCI Express" or "PCIe") or interconnects similar to Intel® QuickPath Interconnect ("QPI"). Wireless interconnect technologies may include, but are not limited to, those associated with WiGig™ and/or Wi-Fi™ and may include establishing and/or maintaining wireless communication channels through various frequency bands to include Wi-Fi and/or WiGig frequency bands, e.g., 2.4, 5 or 60 GHz. These types of wireless interconnect technologies may be described in various standards promulgated by the Institute of Electrical and Electronic Engineers (IEEE). These standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). One such standard related to WiFi and WiGig and also to wireless docking is IEEE 802.11ad.

According to some examples, circuitry 160 may include one or more processing elements and graphics engines capable of executing OS 142 which may also be at temporarily maintained at memory 170. Circuitry 160 may also be capable of executing App(s) 144 also at least temporarily maintained at memory 170. In some examples, context information and memory content associated with executing applications such as App(s) 144 or OS 142 may be sent from logic and/or features of device 105 via interconnect 101. The context information and memory content may enable circuitry 160 to take over or resume execution of App(s) 144 and/or OS 142 from circuitry 120. The context information may be flushed from one or more caches (e.g., processor cache(s)) used by circuitry 120 to execute App(s) 144 and/or OS 142. Memory content included in memory 140 (e.g., a near memory) as well as the flushed context information may then be sent to a second near memory at device 155 (e.g., included in memory 170). The second near memory now having the flushed context information and the memory content may enable circuitry 160 to execute App(s) 144 which may result in a presentation of that execution on display 150 as executing application 144(b).

In some examples, App(s) 144 may include types of applications that a user of device 105 may desire to utilize increased computing, memory or I/O resources available at device 155. For example, due to active cooling, a fixed power source and a larger form factor, circuitry 160 may include a significantly higher amount of computing power and/or memory resources than circuitry 120. In terms of higher computing power this may be due, at least in part, to a higher thermal capacity for dissipating heat from circuitry 160 via use of fan(s) 165 and also to greater surface areas to dissipate heat via passive means such as large heat sinks or heat pipes. Thus, circuitry 160 can operate within a significantly higher thermal range. Also, in terms of higher memory resources, a large form factor may allow for additional memory modules. Further, receiving power via power outlet 195 may allow device 155 to provide a significantly higher current-carry capacity to circuitry 160 and/or memory 170. A higher current-carrying capacity may enable circuitry 160 and/or memory 170 to more quickly respond to rapid bursts of computing demand that may be common with some types of applications such as interactive gaming or video editing.

App(s) 144 may also include types of applications such as high definition streaming video applications (e.g., having at least 4K resolution) to be presented on larger displays such as displays having a vertical display distance of 15 inches or more. For example, circuitry 120 may be adequate for presenting high definition video on a relatively small touchscreen/display 110 but a larger touchscreen/display 150 may exceed the capability of circuitry 120 and/or the thermal capacity of device 105. Thus, circuitry 160 may be utilized to execute these types of applications to present the high definition streaming to the larger touchscreen/display 150 or to an even larger display possibly included in peripheral(s) 185.

App(s) 144 may also include a touch screen application capable of being used on large or small displays. For example, the touch screen application may be executed by circuitry 160 to present larger sized and/or higher resolution touch screen images to touchscreen/display 150. Also, the touch screen application may be able to mirror touch screen images on multiple screens. For example, a portion of the touch screen application may be implemented by circuitry 120 to present executing application 144(a) to touchscreen/display 110 and another portion may be implemented by circuitry 160 to present executing application 144(b) to touchscreen/display 150. For this example, coherency information may be exchanged between circuitry 120 and circuitries 160 via interconnect 101 to enable the joint execution of the touch screen application. According to some examples, logic and/or features at device 105 may be capable of migrating one or more copies of memory contents included in memory 140 to memory 170. Once a copy of memory contents is migrated to memory 170, circuitry 160 may use the copy of memory contents to execute App(s) 144. For these examples, the one or more copies of memory contents may be migrated in a manner that is transparent to at least OS 142 executed by circuitry at either device 105 or device 155. As described more below, use of a two-level memory (2LM) architecture or scheme may allow for this type of information exchange that is transparent to an operating system such as OS 142 and/or App(s) 144. Also, as described more below, the 2LM architecture may include near memories separately maintained at two devices and a far memory maintained at one of the two devices. The two near memories and the one far memory may be composed so that an OS such as OS 142 or an application such as App(s) 144 may not be aware of which device is actually executing the OS or application. As a result, migration of the one or more copies of memory content between the separately maintained near memories may be transparent to the OS or application.

Figure 2:
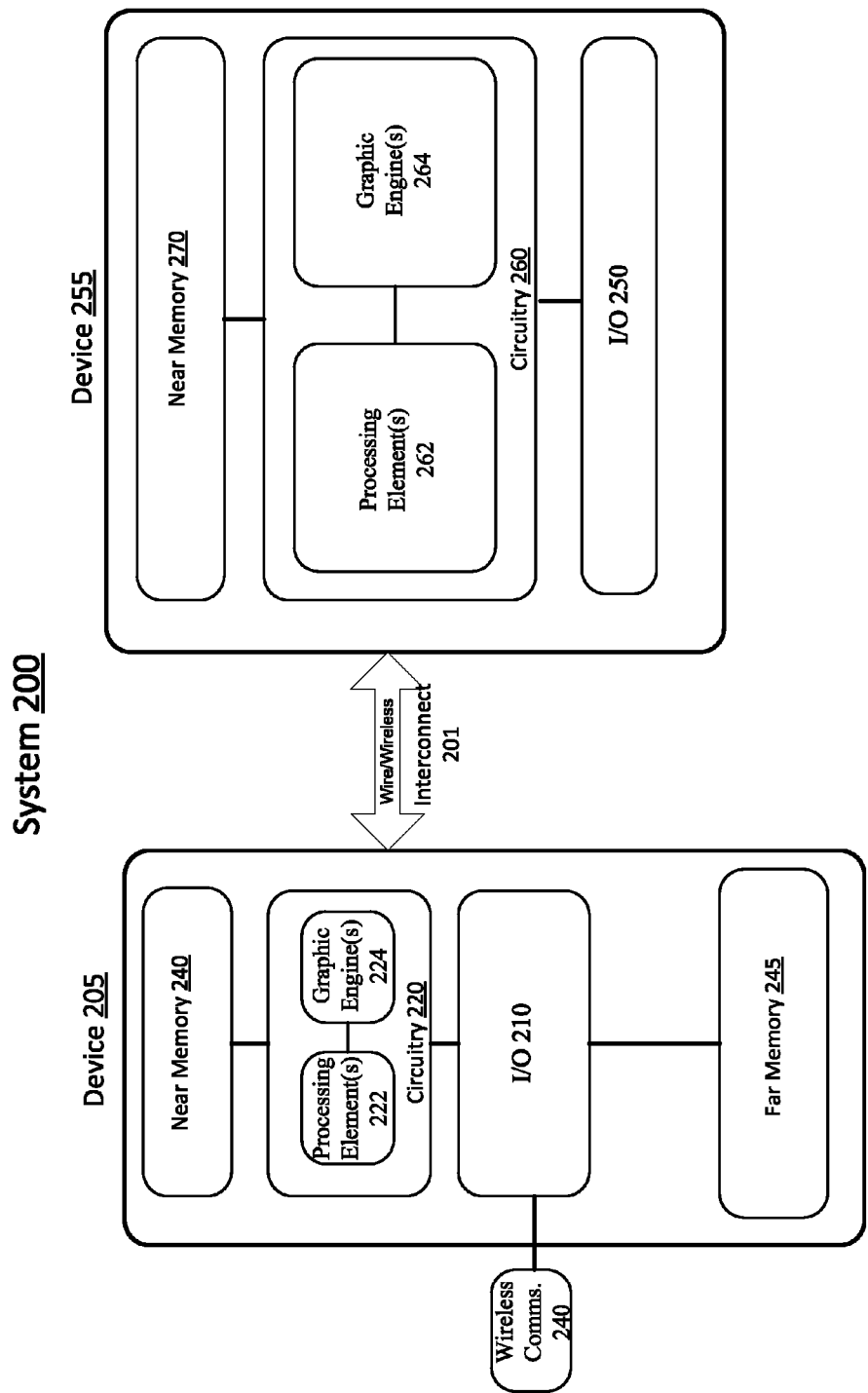
FIG. 2 illustrates an example of a second system.

FIG. 2 illustrates an example second system. In some examples, the example second system includes system 200. System 200 as shown in FIG. 2 includes various components of a device 205 and a device 255. According to some examples, components of device 205 may be coupled to components of device 255 via an interconnect 201. Similar to device 105 and 155 mentioned above for FIG. 1, interconnect 201 may be established via wired or wireless communication channels through wired and/or wireless interfaces operating in compliance with various interconnect technologies and/or standards. As a result, interconnect 201 may represent a low latency, high bandwidth and efficient interconnect to allow for computing, memory or I/O resources to be aggregated or composed between at least some components of devices 205 and 255.

In some examples, as shown in FIG. 2, device 205 may have circuitry 220 that includes processing element(s) 222 and graphic engine(s) 224. These elements of circuitry 220 may be capable of executing one or more applications similar to App(s) 144 mentioned above for FIG. 1. Also, device 255 may have circuitry 260 that includes processing element(s) 262 and graphic engine(s) 264. The relative sizes of the elements of circuitry 220 or near memory 240 as depicted in FIG. 2 compared to circuitry 260 or near memory 270 may represent increased computational abilities or memory resources for device 255 compared to device 205. These increased computation abilities or memory resources may be attributed, at least in part, to the various examples given above for device 155 when compared to device 105 (e.g., fixed power source, higher thermal capacity, high current-carrying capacity, larger form factor, etc.). According to some examples, in addition to a low latency, high bandwidth and efficient interconnect, a 2LM architecture may be implemented at device 205 and device 255 to facilitate a quick and efficient exchange of context information and memory contents for an application being executed by circuitry 220 to be switched and then executed by circuitry 260 in a somewhat seamless manner (e.g., occurs in a fraction of a second). For example, near memory 240 at device 205 may include low latency/higher performance types of memory such as DDR SRAM. Also near memory 270 at device 255 may include similar types of memory. As part of the 2LM architecture, far memory 245 may include higher latency/lower performance types of memory such as, but not limited to, one or more of 3-D cross-point memory, NAND flash memory, NOR flash memory, ferroelectric memory, silicon-oxide-nitride-oxide-silicon (SONOS) memory, polymer memory such as ferroelectric polymer memory, ferroelectric transistor random access memory (FeTRAM) or FeRAM) or ovonic memory. According to some examples, an OS for device 205 or 255 and the application to be executed by either circuitry 220 or 260 may recognize far memory 245 as system memory and near memories 240 and 270 may serve as caches to far memory 245 for use by circuitry 220 and 260 when executing the application. In some examples, following establishment of interconnect 201, logic and/or features of device 205 may determine that an application being executed by circuitry 220 can be executed by circuitry 260 at device 255. For these examples, the logic and/or features of device 205 may migrate a copy of memory content used for executing the application from near memory 240 to near memory 270 via interconnect 201. Once the copy of memory content is migrated to near memory 240 the memory content may be used by circuitry 260 to resume execution of the application.

According to some examples, logic and/or features at device 205 may then route I/O information associated with circuitry 260 now executing the application. For these examples, the at least portion of far memory 245 serving as part of the 2LM architecture for device 205 may facilitate this routing of I/O information such that an OS for device 205 and/or device 255 may not be aware of which near memory at device 205 or device 255 is being used. As a result, the routing of the I/O information between device 205 and device 255 may be done in manner that is transparent to the OS for device 205 and/or device 255.

In some examples, the 2LM architecture implemented at both device 205 and device 255 may enable device 205 to use substantially less power by not having to maintain operating power levels for near memory 240 once a copy of memory content is migrated to near memory 270. Additionally, far memory 245 and near memory 270 may appear to an OS as the same 2LM architecture and thus may mask or make transparent the migration of the copy of memory content and flushed context information between devices 205 and 255. As such, the OS may not notice that the application has migrated for execution on circuitry existing on a separate device. Further, additional power may be saved by logic and/or features of device 205 powering down circuitry 220 to a sleep or similar type of lower power state following the flushing of context information from processor caches (not shown) used by circuitry 220 to execute the application. Other components of device 205 may remain powered such a wireless comms. 240, I/O 210 and far memory 245. But these other components may use a considerably less amount of power and thus device 205 may conserve a significant amount of battery power.

Although not shown in FIG. 2, in some examples, a far memory may also be maintained at device 255. For these examples, the far memory at device 255 may serve as a type of cache to compensate for potential latency issues associated with interconnect 201. Also, the far memory at device 255 may allow logic and/or features of device 255 to use both near memory 270 and the far memory at device 255 to support varying memory aperture sizes to be configured during connection with device 205. Thus, near level memory 270 may be dynamically sized to match a capacity to receive flushed context information from near level memory 240.

According to some examples, as shown in FIG. 2, wireless comms. 240 may couple to device 205. For these examples, wireless comms. 240 may be means via which device 205 may serve as a tether for device 255 to either a wireless network or another device. This may occur through various type of wireless communication channels such as a Bluetooth™, WiFi, WiGig or a broadband wireless/4G wireless communication channel. I/O information associated with execution of the application may be received via these types of wireless communication channels. For example, high definition video may be streamed through a 4G wireless communication channel associated with a subscription or user account to access a 4G wireless network using device 205 but not device 255. For these examples, I/O 210 may be capable of receiving the streaming video information through wireless comms. 240 and at least temporarily store the streaming video at far memory 245. Logic and/or features at device 205 may then route this I/O information via interconnect 201 to near memory 270 for execution of a video display application by circuitry 260. Logic and/or features at device 205 may then cause the high definition video to be presented to a display (not shown) coupled to device 255 through I/O 250. In some examples, logic and/or features of device 205 may receive an indication that the connection to device 255 via interconnect 201 is to be terminated. For example, a user of device 255 and/or 205 may indicate via an input command (e.g., detected via keyboard or natural UI input event) that device 205 is about to be physically disconnected from a wired communication channel. Alternatively, if interconnect 201 is through a wireless communication channel, logic and/or features of device 205 may detect movement of device 205 in a manner that may result in device 205 moving outside of a given physical proximity to device 255. The given proximity may be a range which device 205 may maintain an adequate wireless communication channel to exchange information via interconnect 201.

According to some examples, responsive to receiving the indication of a pending termination of interconnect 201, logic and/or features of device 205 may cause circuitry 220 and near memory 240 to power back up to an operational power state. As mentioned above, these components of device 205 may have been powered down following the migration of flushed context information and memory content to near memory 270. For these examples, logic and/or features of device 255 may cause context information for executing an application at circuitry 260 to be flushed from cache(s) (not shown) and a second copy of memory content maintained in near memory 270 to be sent to far memory 245 via interconnect 201. Once the flushed context information and the second copy of memory content is received at far memory 245, the flushed context information and at least a portion of the second copy of memory content may be migrated/stored to near memory 240. Circuitry 220 may then use the flushed context information and at least a portion of the second copy of memory content to resume execution of the application. In some examples, logic and/or features at device 255 may then power down circuitry 260 and near memory 270 following the sending of the context information and the second copy of memory content to far memory 245 via interconnect 201.

Figure 3:
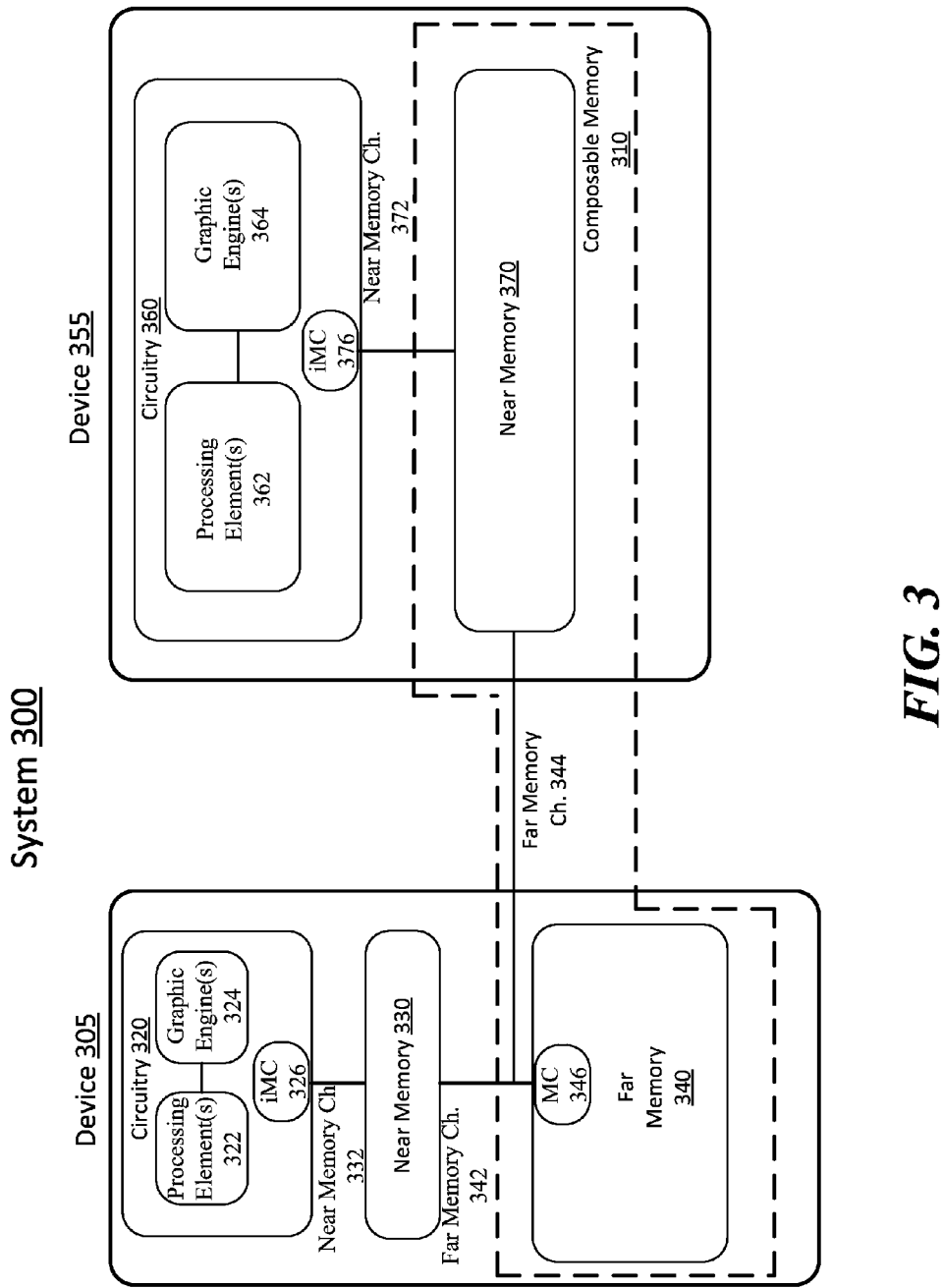
FIG. 3 illustrates an example of a third system.

FIG. 3 illustrates an example third system. In some examples, the example third system includes system 300. System 300 as shown in FIG. 3 includes various components of a device 305 and a device 355. The various components are similar to the components mentioned above for device 205 and device 255 described above for system 200 in FIG. 2. Namely, Devices 305 and 355 have respective circuitry 320 and 360 that include respective processing element(s) 322/362 and graphic(s) engines 324/364. Also, as shown in FIG. 3, devices 305 and 355 may include separate near memories 330 and 370 and device 305 has a far memory 340.

According to some examples, as shown in FIG. 3, system 300 may include a composable memory 310 having far memory 340 and near memory 370. For these examples, although not shown in FIG. 3, a low latency, high bandwidth, wireless or wired interconnect may couple device 305 to device 355 to enable a far memory channel 344 to be established between far memory 340 maintained at device 305 and near memory 370 maintained at device 355.

As described in more detail below, composable memory 310 along with near memory 330 may be part of a 2LM architecture or scheme that facilitates migration of one or more copies of memory contents between near memory 330 and near memory 370 in a manner that may be transparent to an OS for device 305 or 355. In other words, the OS may not be aware of which device may be executing one or more applications as context information and copies of memory contents associated with executing the one or more applications are migrated between near memory 330 used by circuitry 330 to near memory 370 used by circuitry 360. The transparency may be based on the 2LM architecture implemented in a way such that far memory 340 may be presented to the OS as system main memory and near memories 330 and 370 may serve as caches to far memory 340 for use by respective circuitry 320 and 360 when executing the one or more applications. As a result, the OS may only be aware of far memory 340 and is unaware of the migration of context information and one or more copies of memory contents between the two near memories.

In some examples, near memory 370 may include a first memory capacity that is substantially larger than a second memory capacity for near memory 330. For example, near memory 320 may have a memory capacity of less than a gigabyte and near memory 370 may have a memory capacity of several gigabytes. The memory capacity differential may be due to a larger form factor size of device 355 and also due to greater computational resources included in circuitry 360 compared to circuitry 320 that may lead to a higher need for more memory capacity to match the greater computational resources. The examples are not limited to only these two reasons for possible memory capacity differences.

According to some examples, since circuitry 320 and circuitry 360 are both capable of executing applications using a 2LM architecture, a size differential between near memories 330 and 370 may be accommodated by ensuring a memory capacity for far memory 340 is equal to or greater than the memory capacity of near memory 370. For these examples, far memory 340 may be composed of types of non-volatile memory that may have lower access latencies but may use substantially less power and cost substantially less per gigabyte of memory capacity compared to types of memory possibly used for near memories 330 or 370. The lower cost and less power usage may enable a substantially larger memory capacity for far memory 340 compared to near memory 330.

In some examples, via use of a 2LM architecture, an OS for devices 305 and 355 may be arranged to be executed by circuitry 320 or 360 based on a memory capacity associated with far memory 340 that is at least equal to a memory capacity for near memory 370. For these examples, migration of execution of applications from device 305 to device 355 may be facilitated by the OS not having to resize/translate memory addressing structures to account for potentially different memory capacities associated with near memories 330 and 370. The memory addressing scheme used by an OS when executed by circuitry 320 may be designed such that significantly larger near memories used by other circuitry such as near memory 370 used by circuitry 360 can better utilize large memory capacities. For example, if the OS was to use only a memory addressing scheme associated with a memory capacity for near memory 330, then benefits of having a larger memory capacity at near memory 370 may be reduced by using the memory addressing scheme associated with the lower memory capacity of near memory 330. In some examples, an integrated memory controller (iMC) 376 located at or with circuitry 360 or an iMC 326 located at or with circuitry 320 may use various memory channels to facilitate movement of memory content information associated with execution of one or more applications. Also, a memory controller (MC) at or with far memory 340 may provide requested data to iMC 376 or iMC 326 via the various memory channels, e.g., responsive to page misses in respective near memories that may result during execution of the one or more applications.

In some examples, in addition to far memory channel 344 mentioned above, the various memory channels shown in FIG. 3 to retrieve, send, copy or migrate memory content information may include near memory channel 372 between circuitry 360 and near memory 370. The various memory channels may also include far memory channel between far memory 340 and near memory 330 or near memory channel 332 between circuitry 320 and near memory 330. As briefly mentioned above and described more below, logic and/or features at device 305 or device 355 may utilize a 2LM architecture to execute one or more applications such that memory content maintained at near memories 330 or 370 may be retrieved, sent, copied or migrated via these various memory channels in a manner that may be transparent to an OS for device 305 or device 355.

Figure 4:
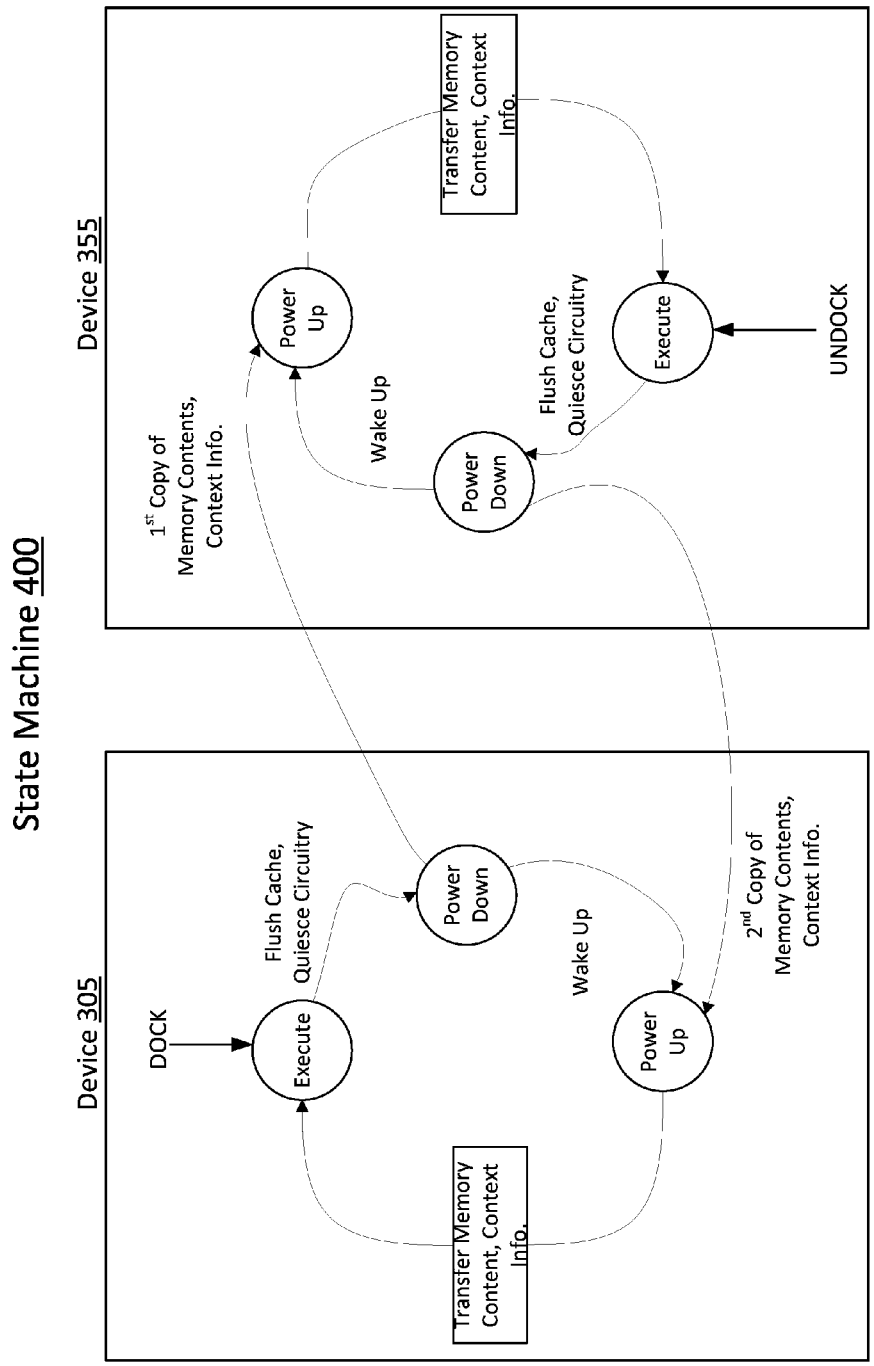
FIG. 4 illustrates an example state machine.

FIG. 4 illustrates an example state machine 400. In some examples, state machine 400 depicts the various states of circuitry and near memory at two devices and the movement of context information and copies of memory contents between the devices. For these examples, elements of system 300 that includes components shown and described above for FIG. 3 for devices 305 and 355 are used to describe state machine 400. However, the example state machine 400 is not limited to the components shown or described above for FIG. 3.

In some examples, as shown in FIG. 4, device 305 may be in an execute state when a dock first occurs or is detected by logic and/or features at device 305. For these examples, circuitry 320 may be executing one or more applications. Following detection of the dock, logic and/or features at device 305 may cause context information associated with executing the one or more applications to be flushed from cache(s) used by circuitry 320. The logic and/or features may then quiesce circuitry 320. The logic and/or features may also migrate a first copy of memory contents of near memory 330 to far memory 340 and then power down both circuitry 320 and near memory 330 to a low/non-operating power state (e.g., a sleep power state). The logic and/or features at device 305 may then cause context information and the first copy of memory contents to be further migrated to near memory 370 at device 355 via a memory channel routed through an interconnect.

According to some examples, logic and/or features at device 355 may wake up circuitry 260 and near memory 270 to a power up state that may be an operating power state. The wake up may occur following detection of the dock. The logic and/or features may then store the received first copy of memory content and context information to near memory 270. Circuitry 260 may now be in an execute state to execute the one or more applications previously executed by circuitry 320 at device 305.

In some examples, logic and/or features at device 355 may receive an indication that device 355 is about to undock from device 305. For these examples, the logic and/or features at device 355 may cause context information associated with executing the one or more applications to be flushed from cache(s) used by circuitry 360. The logic and/or features may then quiesce circuitry 360. The logic and/or features may also migrate a second copy of memory contents of near memory 370 to far memory 340 and then power down both circuitry 360 and near memory 370 to a low/non-operating power state (e.g., a sleep state).

According to some examples, logic and/or features at device 305 may wake up circuitry 320 and near memory 330 to a power up state that may be an operating power state. The wake up may occur following an indication that device 305 is about to undock from device 355. The logic and/or features may then transfer the second copy of the memory content and context information from far memory 340 to near memory 330. Circuitry 320 may now be in an execute state to execute the one or more applications previously executed by circuitry 360 at device 355. In some examples, the transition of the states shown in FIG. 4 for state machine 400 may occur at rates that may be substantially imperceptible to a user of device 305 or device 355. For example, less than a fraction of a second (e.g., $1/10^{th}$ of a second). As described more below, logic and/or features at both device 305 and 355 may be capable of implementing various policies to ensure a rapid migration of copies of memory contents between near memories 330 and 370 to enable execution of one or more applications to be switched between circuitry 320 at device 305 to circuitry 360 at device 355 and then back to circuitry 320 when the two devices undock in a substantially imperceptible manner as perceived by a user.

Figure 5:
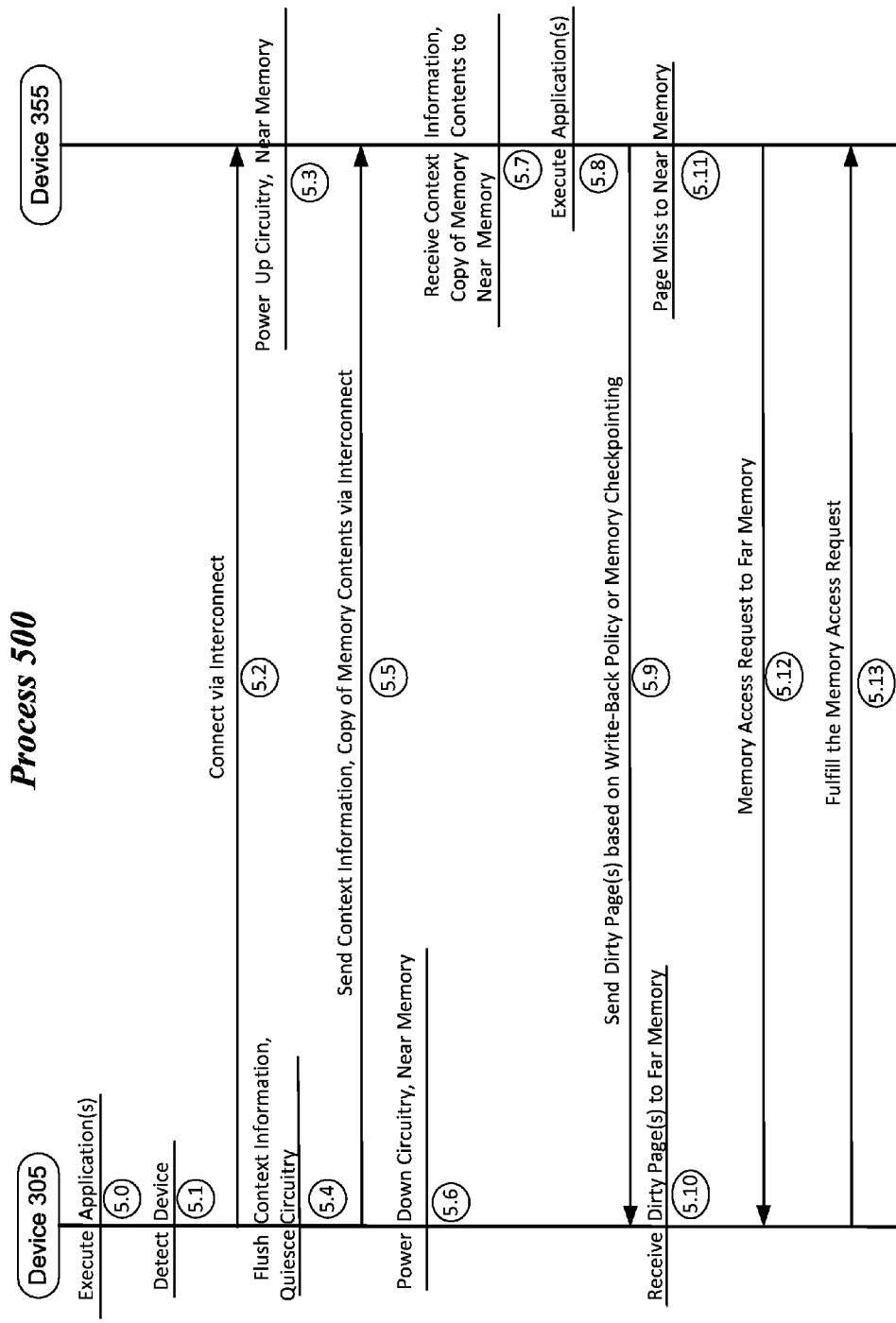
FIG. 5 illustrates an example of a first process.

FIG. 5 illustrates an example process 500. In some examples, process 500 may be for aggregating or composing memory resources between devices. For these examples, elements of system 300 as shown in FIG. 3 may be used to illustrate example operations related to process 500. However, the example processes or operations are not limited to implementations using elements of system 300.

Beginning at process 5.0 (Execute Application(s)), circuitry 320 of device 305 may be executing one or more applications. For example, the one or more applications may include a video streaming application to present streaming video to a display at device 305.

Proceeding to process 5.1 (Detect Device), logic and/or features at device 305 may detect device 355 having circuitry 360 capable of executing at least a portion of the one or more applications being executed by device 355.

Proceeding to process 5.2 (Connect via Interconnect), logic and/or features at device 305 may cause device 305 to connect to device 355 via an interconnect. In some examples, the connection for the interconnect may be via a wired communication channel. In other examples, the connection for the interconnect may be via a wireless communication channel.

Proceeding to process 5.3 (Flush Context Information, Quiesce Circuitry), logic and/or features at device 305 may cause context information used to execute the at least portion of the one or more applications to be flushed from near memory 330. For example, video frame information at least temporarily maintained in near memory 330 may be flushed.

Proceeding to process 5.4 (Send Context Information, Copy of Memory Contents via Interconnect), logic and/or feature at device 305 may cause the flushed context information and a copy of memory contents of near memory 330 to be sent to device 355 via the wired/wireless interconnect. In some examples, the flushed context information and the copy of memory contents may be first sent to far memory 340 prior to being sent to device 355 via the wired/wireless interconnect.

Proceeding to process 5.5 (Power Down Circuitry, Near Memory), logic and/or features at device 305, following the sending of flushed context information and the copy of memory contents may cause circuitry 320 and near memory 330 to power down.

Proceeding to process 5.6 (Receive Context Information, Copy of Memory Contents to Near Memory), logic and/or features at device 355 may receive the context information and the copy of memory contents to near memory 370.

Proceeding to process 5.7 (Execute Application(s)), circuitry 360 may execute the one or more applications using the flushed context information and copy of memory contents received/stored to near memory 370. For example, video frame information for executing the video display application may be used to present streaming video to a display coupled to device 355. The streaming video may be high definition video (e.g., at least 4K resolution) presented to a large size display (e.g., greater than 15 inches).

Proceeding to process 5.8 (Send Dirty Page(s) based on Write-Back Policy or Memory Checkpointing), logic and/or features at device 355 may implement a write-back policy or memory checkpointing that cause one or more dirty pages generated during execution of the one or more applications by circuitry 360 to be send to device 305. In some examples, the write-back policy or memory checkpointing may be implemented to minimize or reduce a number of dirty pages that would need to be migrated back to device 305's near memory 330 upon an undocking. The write-back policy or memory checkpointing may include one or more thresholds or time limits that once exceeded cause the sending of dirty pages to far memory 340. As a result of sending dirty pages on a periodic or threshold basis, an amount of memory contents transferred at time of undocking is reduced. This reduction in time may enable migration of the execution of the one or more applications back to device 305 in a manner that may be imperceptible to a user of device 305.

In some examples, a write-back policy that includes a periodic sending of dirty pages may be based on a time period that balances the need to quickly undock and migrate memory contents from near memory 370 to near memory 340 and attempting to conserve power. For example, the wired/wireless interconnect used to send/receive the dirty pages may use a substantial amount of power if the time period was short. Longer time periods would be more energy efficient, but if an undocking event occurs shortly before a longer time period expires, the migration of the memory contents may be delayed and a user may perceive this delay.

According to some examples, a write-back policy that includes sending dirty pages on a threshold basis may include a first threshold number based on a memory capacity for near memory 330. For example, if near memory 330 has a relatively small memory capacity compared to near memory 370, the first threshold number of dirty pages should be low enough that the smaller memory capacity of near memory 330 can receive all of the dirty page without exceeding its memory capacity. The first threshold number may also be based on respective data bandwidth and latencies for migrating a copy of memory contents between far memory 340 and near memory 370 via a wired/wireless interconnect to ensure that the migration of memory contents allows circuitry 320 to resume execution of the one or more applications in a timely manner without perceptible interruptions. For these examples, the lower the data bandwidth and the higher the latencies for migrating memory contents, the lower the first threshold number of dirty pages.

In some examples, the write-back policy may include a second threshold number that may be associated with an undocking response time between detection of a user-initiated undocking until the time of the actual decoupling or termination of the interconnect. For these examples, the second threshold may be based on a data bandwidth capability for migrating a second copy of memory contents between far memory 340 and near memory 370 via the wired/wireless interconnect. The second threshold may also be based on a time limit associated with disconnecting device 355 from device 305 (e.g., $\frac{1}{10}^{th}$ of a second) and a size associated with dirty pages generated during execution of the one or more applications by circuitry 360. For example, larger sized dirty pages would result in a lower second threshold number. Also, lower data bandwidths and higher latencies may also result in a lower second threshold number.

In some examples, memory checkpointing may be used as an error correction/recovery technique in which the one or more applications being executed by circuitry 360 at device 355 are placed in well-known states or recovery points. For these examples, the recovery points may enable the one or more applications to be restored to a known state in the event of an unexpected/surprise undocking of device 305 to device 355. Interconnect characteristics may define a threshold amount of memory contents in near memory 370 that may be safely present at any instant, before which memory content data needs to be copied back to at least far memory 340 to reach a recovery point or known state following an unexpected undocking. If the interconnect between device 305 and 355 is a low latency, high bandwidth interconnect capable of copying memory contents from near memory 370 in a very short time (e.g., less than $\frac{1}{100}^{th}$ of a second) then no memory checkpointing may be need. However if needed, memory checkpointing may establish a type of dynamic threshold number of dirty pages based on such interconnect characteristics as available data bandwidth, observed latencies over the interconnect, or assigned power usage limits for migrating memory contents between near memory 370 and at least far memory 340 over the interconnect.

According to some examples, the dynamic threshold number of dirty pages associated with memory checkpointing may also be based on MC 346's write latency to far memory 340. If MC 346 has a relatively long write latency, then the threshold number of dirty pages would be lower to accommodate this longer write latency. The dynamic threshold number of dirty pages may also be based on a read latency of iMC 376 for reading data from near memory 370. For example, a relatively fast read latency may allow for a higher threshold number of dirty pages. The above mentioned criteria for setting a threshold number of dirty pages for memory checkpointing are just a few of the example criteria, examples are not limited to just the above mentioned criteria.

Proceeding to process 5.9 (Receive Dirty Page(s) to Far Memory), logic and/or features at device 305 may receive one or more dirty pages to far memory 340. The one or more dirty pages may represent at least a portion of memory content maintained in near memory 370 and may have been sent according to a write-back policy or as part of memory checkpointing.

Proceeding to process 5.10 (Page Miss to Near Memory), circuitry 360 during the execution of the one or more applications may request data that is not included in the memory contents migrated to near memory 370. In some examples, the lack of the data in near memory 370 may result in a page miss. For these examples, the data may be maintained in far memory 340.

Proceeding to process 5.11 (Memory Access Request to Far Memory), logic and/or features at device 355 such as iMC 376 may generate and send a memory access request to MC 346 at far memory 340. In some examples, the memory access request may be to obtain data responsive to the page miss.

Proceeding to process 5.12 (Fulfill the Memory Access Request), logic and/or features at device 305 such as MC 346 may receive the memory access request and fulfill the request in order to provide the data associated with the page miss.

In some examples, at least processes 5.7 to 5.12 of process 500 may continue until a disconnection/termination of the interconnect connecting device 355 to device 305. As mentioned more below, in some example, another series of processes may be implemented by logic and/or features at devices 305 and 355 to allow context information and memory contents for executing the one or more applications to migrate back to near memory 330. The migration may occur prior to the termination of the interconnect.

Figure 6:
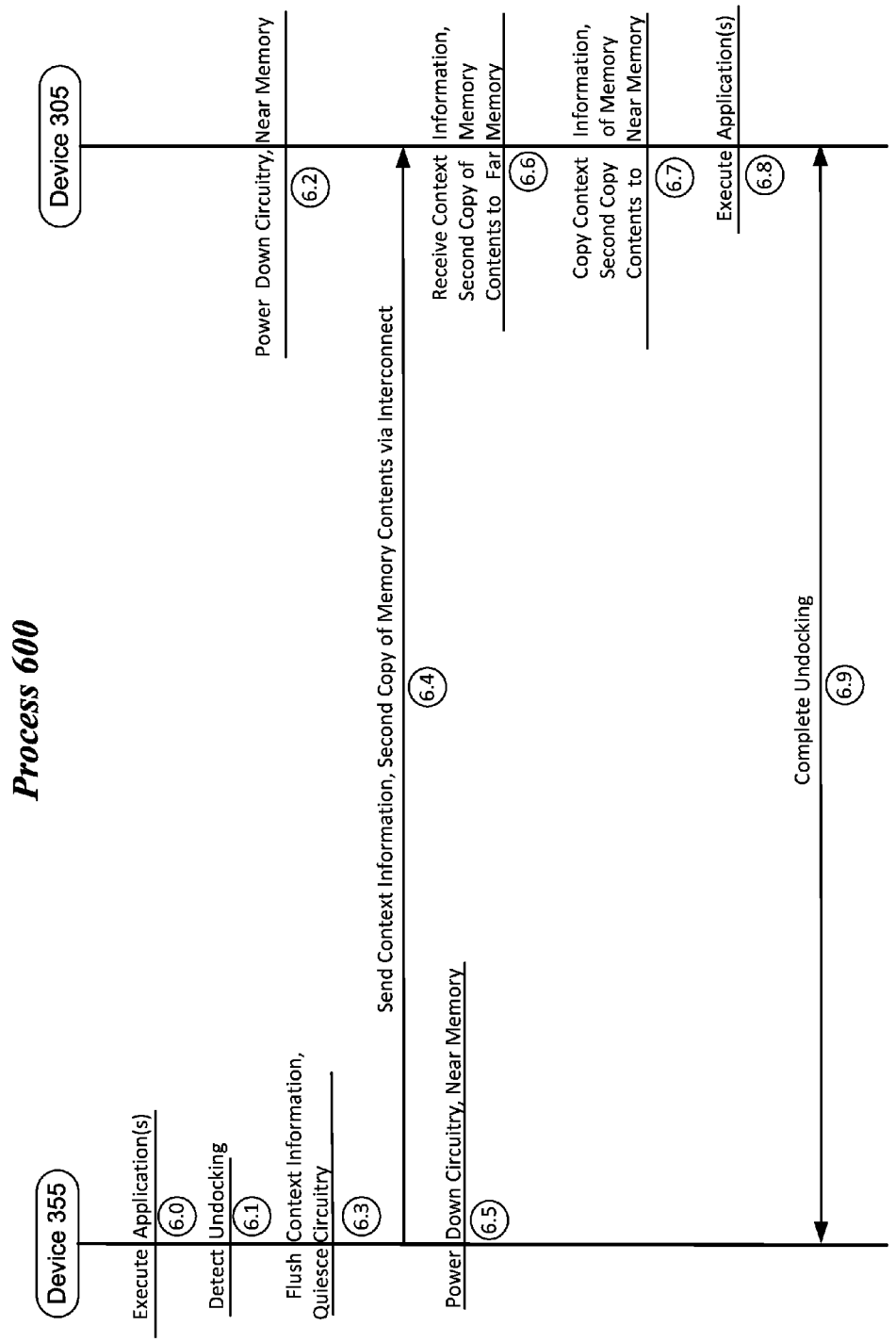
FIG. 6 illustrates an example of a second process.

FIG. 6 illustrates an example process 600. In some examples, process 600 may be for undocking or disconnecting an aggregated or composed memory resource between devices. For these examples, elements of system 300 as shown in FIG. 3 may be used to illustrate example operations related to process 600. Also, process 600 may be a continuation of process 500 following the aggregation or composing of memory resources as described above for FIG. 5. However, the example processes or operations are not limited to implementations using elements of system 300 or to a continuation of process 500.

Beginning at process 6.0 (Execute Application(s)), circuitry 360 of device 355 may be executing one or more applications that were previously executed by circuitry 320 of device 305 prior to docking as mentioned above for process 500.

Proceeding to process 6.1 (Detect Undocking), logic and/or features at device 355 may detect or receive an indication that the connection to device 305 is to be terminated. In some examples, if the connection is via a wired interconnect, the detection may be based on a user causing the indication by inputting an indication and/or physically removing device from a dock or unplugging a connector (e.g., a dongle) for the wired interconnect. In other examples, if the connection is via a wireless interconnect, the detection may be based on the user initiating movement of device 305 in a direction away from device 355 in a manner that indicates the wireless interconnect is soon to be disconnected or fall out of an acceptable range to maintain the wireless interconnect.

Proceeding to process 6.2 (Power Up Circuitry, Near Memory), logic and/or features at device 305 may power up circuitry 320 and near memory 330 in anticipation of the undocking. In some examples, as mentioned above for process 500, a write-back policy that may have caused at least a portion of memory contents maintained in near memory 370 during the execution of the one or more applications by circuitry 360 to be periodically sent to device 305 and stored at far memory 340. For these examples, these previously sent dirty pages may be copied to near memory 330 upon initial power up to reduce the amount of total copied memory contents that may need to be migrated to enable circuitry 320 to execute the one or more applications in a more time efficient manner.

Proceeding to process 6.3 (Flush Context Information, Quiesce Circuitry), logic and/or features at device 355 may cause context information used to execute the one or more applications to be flushed from near memory 370. The logic and/or features may then quiesce circuitry 360. Proceeding to process 6.4 (Send Context Information, Second Copy of Memory Contents via Interconnect), logic and/or feature at device 355 may cause the flushed context information and a second copy of memory contents to be sent to device 305 via the interconnect. In some examples, the context information and the second copy of memory contents may be received at far memory 340. For these examples, as mentioned above for process 6.2, other portions of the memory contents previously maintained in near memory 370 may have been sent as part of a write-back policy to facilitate timely migration of memory content between device 355 and device 305. Portions not previously sent as part of the write-back policy may now be sent with the second copy of memory contents to allow for less data to be transferred via the interconnect.

Proceeding to process 6.5 (Power Down Circuitry, Near Memory), logic and/or features at device 355 may then power down both circuitry 360 and near memory 370.

Proceeding to process 6.5 (Receive Context Information, Second Copy of Memory Contents to Near Memory), logic and/or features at device 305 may receive the context information and the second copy of memory contents to far memory 340.

Proceeding to process 6.6 (Store Context Information, Second Copy of Memory Contents to Near Memory), logic and/or features at device 305 may then store the received context information and the second copy of memory contents to near memory 330. In some examples, near memory 330 may have a smaller memory capacity than near memory 370. For these examples, at least a portion of the second copy of memory contents may be storied to near memory 330 based on a memory paging policy. The memory paging policy may include storing memory pages that were actively used by circuitry 360 while executing the one or applications. The memory paging policy may also include storing based on an age associated with a given memory pages, e.g., more recently written to memory pages are stored first or have priority for limited near memory 330 capacity. The memory paging policy may also include storing based on an access pattern associated with the memory pages that may be associated with either a priority scheme or indicate which memory pages were the most recently accessed. Examples are not limited to the above mentioned memory paging policies, other policies to prioritize which memory pages from the second copy of memory contents are to be copied to near memory are contemplated.

Proceeding to process 6.7 (Execute Application(s)), circuitry 320 at device 305 may use the context information and the portions of the second copy of memory contents now stored in near memory 330 to resume execution of the one or more applications.

Proceeding to process 6.8 (Complete Undocking), logic and/or features at both device 305 and 355 may complete the undocking by terminating the connection via the interconnect and process 600 then comes to an end.

Figure 7:
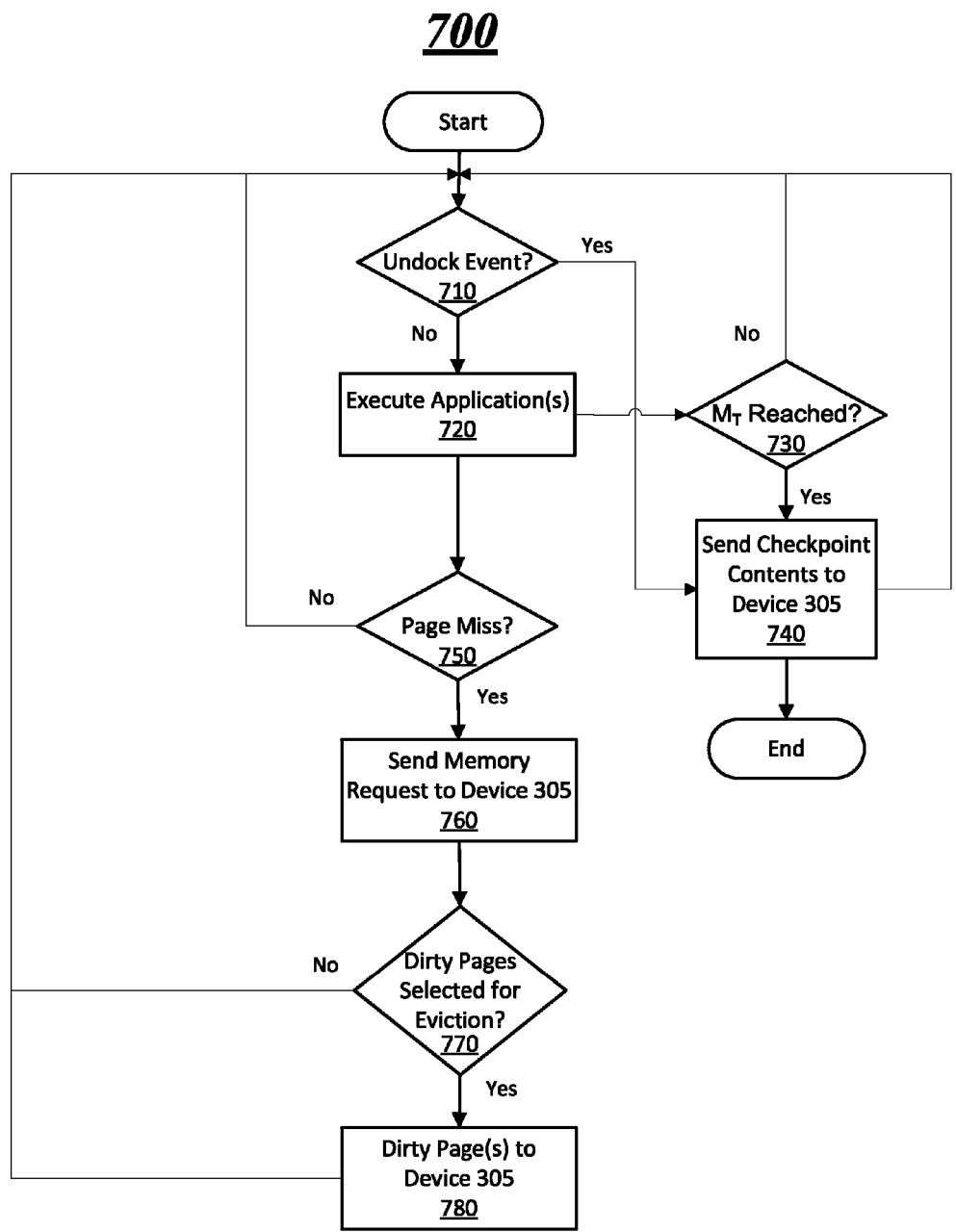
FIG. 7 illustrates an example logic flow for memory checkpointing

FIG. 7 illustrates an example logic flow 700 for memory checkpointing. In some examples, logic flow 700 may be implemented by device 355 of system 300 as described above for FIG. 3 following a docking to device 305 and migration of execution of one or more applications to circuitry 360 of device 355. Also, other components or elements of system 300 may be used to illustrate example processes related to logic flow 700. However, the example processes or operations are not limited to implementation using elements of system 300.

Moving from the start to decision block 710 (Undock Event?), logic and/or features at device 355 may determine whether an undock event has occurred. In some examples, the undock event may be based on receiving or detecting an indication that an undock is about to occur. If an indication of an undock is received or detected, the process moves to block 740. Otherwise, the process moves to block 720.

Moving from decision block 710 to block 720 (Execute Application(s)), circuitry 360 may execute the one or more applications. During execution of the one or more applications the process may move to either decision block 730 or to decision block 750.

Proceeding from block 720 to decision block 730 ($M_T$ Reached?), logic and/or features at device 355 may determine whether a dynamic threshold number of dirty pages referred to as "$M_T$" has been reached. In some examples, $M_T$ may be based on available data bandwidth, observed latencies, or assigned power usage limits for migrating a copy of memory contents between at least far memory 340 and near memory 370 via the wired or wireless interconnect connecting device 355 to device 305. $M_T$ may also be based on MC 346's write latency to far memory 340 and iMCs read latency from near memory 370. For these examples, $M_T$ may impact the frequency at which dirty pages or data needs to be copied to device 305 during execution of the one or more applications by circuitry 360 at device 355. As MC 346's write latency and iMC 376's read latency may be static or fixed, a dynamic threshold number for $M_T$ may still be needed in that interconnect characteristics (moving objects, interference, rain, humidity, etc.) may change. If $M_T$ is reached or exceeded the process moves to block 740. Otherwise, the process returns to decision block 710.

Moving from either decision block 710 or decision block 730 to block 740 (Send Checkpoint Contents to Device 305), logic and/or features of device 355 may send memory checkpoint contents that may include one or more dirty pages to at least far memory 340 at device 305. If the process moved from decision block 710 the process may then come to an end as execution of the one or more applications shifts or migrates back to device 305 and circuitry 360 and near memory 370 are powered down. If the process moved from decision block 730, the process then moves to decision block 710.

Moving from block 720 to decision block 750 (Page Miss?), logic and/or features at device 355 may determine if a page miss has occurred to near memory 370 during the execution of the one or more applications by circuitry 360. In some examples, iMC 376 may make this determination. If a page miss occurs, the process moves to decision block 760. Otherwise, the process moves to decision block 710.

Moving from decision block 750 to decision block 760 (Dirty Pages Present?), logic and/or features at device 355 may determine if any dirty pages may be present and/or ready for sending to at least far memory 340 at device 305. In some examples, copying of data such as dirty pages may be an expensive operation in terms of power usage and possible performance drains to device 355 or device 305. Therefore, to reduce the frequency of copying of dirty pages a technique may be implemented that whenever a page miss to near memory 370 occurs, all the dirty pages present in near memory 370 may be copied to at least far memory 340 at device 305. This may occur even if other thresholds such as $M_T$ have not yet been reached or exceeded. Hence by opportunistically copying dirty pages upon a page miss, interconnect bandwidth may be better utilized and power consumption may also be reduced. In the case of a wireless interconnect, opportunist copying of dirty pages may be a significant benefit as radio utilization may be better optimized for transferring larger amounts of data less frequently compared to small amounts of data more frequently. If dirty pages are present, the process moves to block 770. Otherwise the process moves to 780.

Moving from decision block 760 to block 770 (Send Memory Request and Dirty Page(s) to Device 305), logic and/or features at device 355 may cause a memory request for the page miss and any dirty pages to be sent to device 305. In some examples, MC 346 for far memory 340 may receive the memory request and also cause the dirty pages to be saved to at least far memory 340. For these examples, MC 346 may also fulfill the memory request by causing data associated with the memory request to be obtained from far memory 340 and sent to device 355 and copied to near memory 370. The process then moves to decision block 710.

Moving from decision block 760 to block 780 (Send Memory Request to Device 305), logic and/or features at device 355 may cause just a memory request for the page miss to be sent to device 305. In some examples, as mentioned above for decision block 770, MC 346 for far memory 340 may receive the memory request and fulfill the memory request by causing data associated with the memory request to be obtained from far memory 340 and sent to device 355 and copied to near memory 370. The process then moves to decision block 710.

Figure 8:
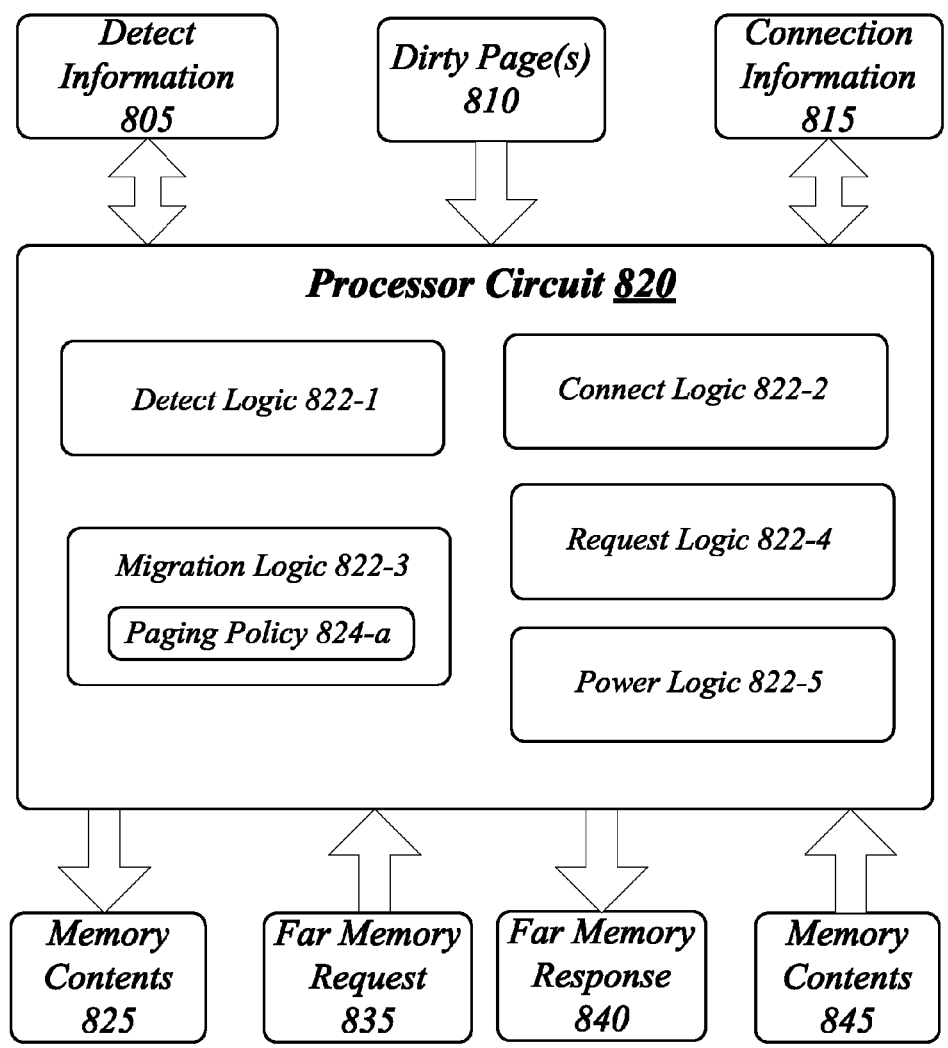
FIG. 8 illustrates an example block diagram for a first apparatus.

FIG. 8 illustrates a block diagram for a first apparatus. As shown in FIG. 8, the first apparatus includes an apparatus 800. Although apparatus 800 shown in FIG. 8 has a limited number of elements in a certain topology or configuration, it may be appreciated that apparatus 800 may include more or less elements in alternate configurations as desired for a given implementation. The apparatus 800 may include a component of a computing device that may be firmware implemented and have a processor circuit 820 arranged to execute one or more logics 822-*a*. It is worthy to note that "a" and "b" and "c" and similar designators as used herein are intended to be variables representing any positive integer. Thus, for example, if an implementation sets a value for a=5, then a complete set of logics 822-*a* may include logics 822-1, 822-2, 822-3, 822-4 or 822-5. The examples are not limited in this context.

According to some examples, apparatus 800 may be part a first device having first circuitry capable of executing one or more applications (e.g. device 105, 205 or 305) using a 2LM architecture including a first near memory and a second far memory. The examples are not limited in this context.

In some examples, as shown in FIG. 8, apparatus 800 includes processor circuit 820. Processor circuit 820 may be generally arranged to execute one or more logics 822-*a*. Processor circuit 820 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon® Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 820. According to some examples processor circuit 820 may also be an application specific integrated circuit (ASIC) and logics 822-*a* may be implemented as hardware elements of the ASIC.

According to some examples, apparatus 800 may include a detect logic 822-1. Detect logic 822-1 may be executed by processor circuit 820 to detect second circuitry capable of executing one or more applications using the 2LM architecture that also includes a second near memory. For example, detect logic 822-1 may receive detect information 805 that may indicate that a second device having the second circuitry and second near memory has connected to the first device via either a wired or wireless communication channel.

In some examples, apparatus 800 may also include a connect logic 822-2. Connect logic 822-2 may be executed by processor circuit 820 to cause device connection between the first far memory and the second near memory via an interconnect. For example, connect logic 822-2 may connect via an interconnect that may operate in compliance with one or more low latency, high bandwidth and efficient interconnect technologies such as PCIe, QPI, WiGig or Wi-Fi. According to some examples, apparatus 800 may also include a migration logic 822-3.

Migration logic 822-3 may be executed by processor circuit 820 to utilize the first far memory to cause a copy of memory contents 825 to migrate from the first near memory maintained at the first device to the second near memory. The copy of memory contents 825 may be migrated in a manner transparent to an OS for the first device or the second device. In some examples, migration logic 822-3 may also facilitate the storing of at least a portion of a copy of memory contents 845 received from the second device in the event of an undocking. The at least portion of the copy of memory contents 845 may be stored according to paging policy 724-*a*. Paging policy 724-*a* may be maintained by migration logic 822-3 in a data structure such as a lookup table (LUT).

In some examples, migration logic 822-3 may receive at least portions of memory contents 845 from the second near memory. The at least portions of memory content 845 may include dirty page(s) 810. Dirty page(s) 810 may have been generated during execution of the one or more applications by the second circuitry. For these examples, migration logic 822-3 may cause dirty page(s) 810 to be stored to at least the first far memory.

According to some examples, apparatus 800 may include a request logic 822-4. Request logic 822-4 may be executed by processor circuitry to receive a memory request 835 that may include a memory access request to the first far memory based on a page miss to the second near memory. For these examples, request logic 822-4 may cause the memory access request included in memory request 835 to be fulfilled to provide data associated with the page miss in a far memory response 840.

According to some examples, apparatus 800 may include a power logic 822-5. Power logic 822-5 may be executed by processor circuit 820 to either cause the first circuitry and the first near memory to be powered down or powered up. For example, the first circuitry and the first near memory may be powered down to a lower power state following the sending of context information and the copy of memory contents 825 to the second device. The first circuitry and the first near memory may subsequently be powered up to a higher power state following an indication that the interconnect between the first and second devices is about to be terminated. The indication may be included in connection information 815 (e.g., user input command or wireless range detection).

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 9:
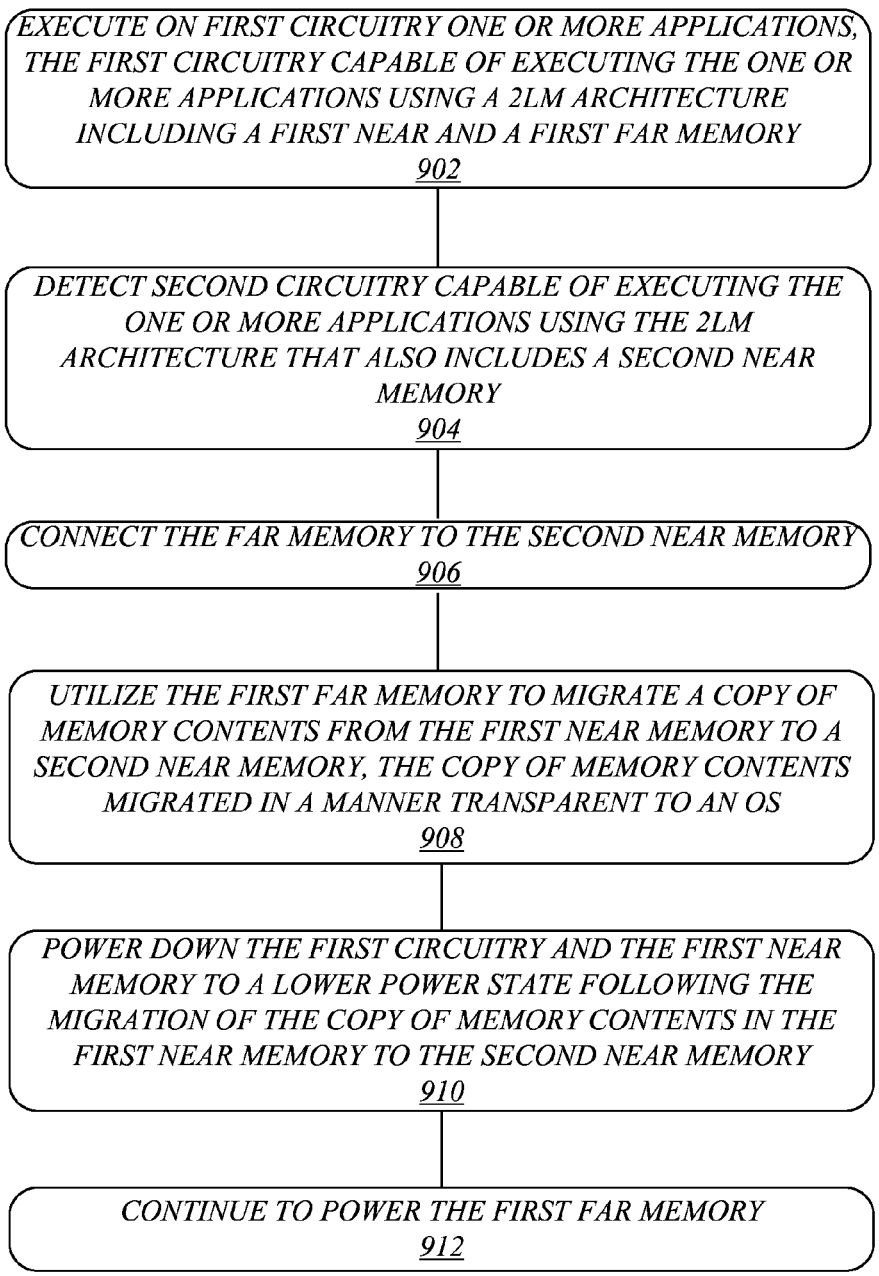
FIG. 9 illustrates an example of a first logic flow.

FIG. 9 illustrates an example of a first logic flow. As shown in FIG. 9, the first logic flow includes a logic flow 900. Logic flow 900 may be representative of some or all of the operations executed by one or more logic, features, or devices described herein, such as apparatus 900. More particularly, logic flow 900 may be implemented by detect logic 822-1, connect logic 822-2, migration logic 822-3, request logic 822-4 or power logic 822-5.

In the illustrated example shown in FIG. 9, logic flow 900 at block 902 may execute on first circuitry one or more applications. The first circuitry may be capable of executing the one or more applications using a 2LM architecture including a first near memory and a first far memory.

According to some examples, logic flow 900 at block 904 may detect second circuitry capable of executing the one or more applications using the 2LM architecture that also includes a second near memory. For these examples, detect logic 822-1 may detect the second circuitry.

In some examples, logic flow 900 at block 906 may connect to the first far memory to the second near memory. For these examples, connect logic 822-2 may cause the connection via an interconnect to become established through either a wired or wireless communication channel. According to some examples, logic flow 900 at block 908 may utilize the first far memory to migrate a copy of memory contents from the first near memory to the second near memory. The copy of memory contents may be migrated in a manner transparent to an operating system. For these examples, migration logic 822-3 may cause the copy of memory contents to be migrated to the second near memory.

In some examples, logic flow 900 at block 910 may power down the first circuitry and the first near memory to a lower power state following the migration of the copy of memory contents in the first near memory to the second near memory. For these examples, power logic 822-5 may cause the first circuitry and the first near memory to be powered down.

According to some examples, logic flow 900 at block 912 may continue to power the first far memory. For these examples, power logic 822-5 may cause power to the first far memory to be continued.

Figure 11:
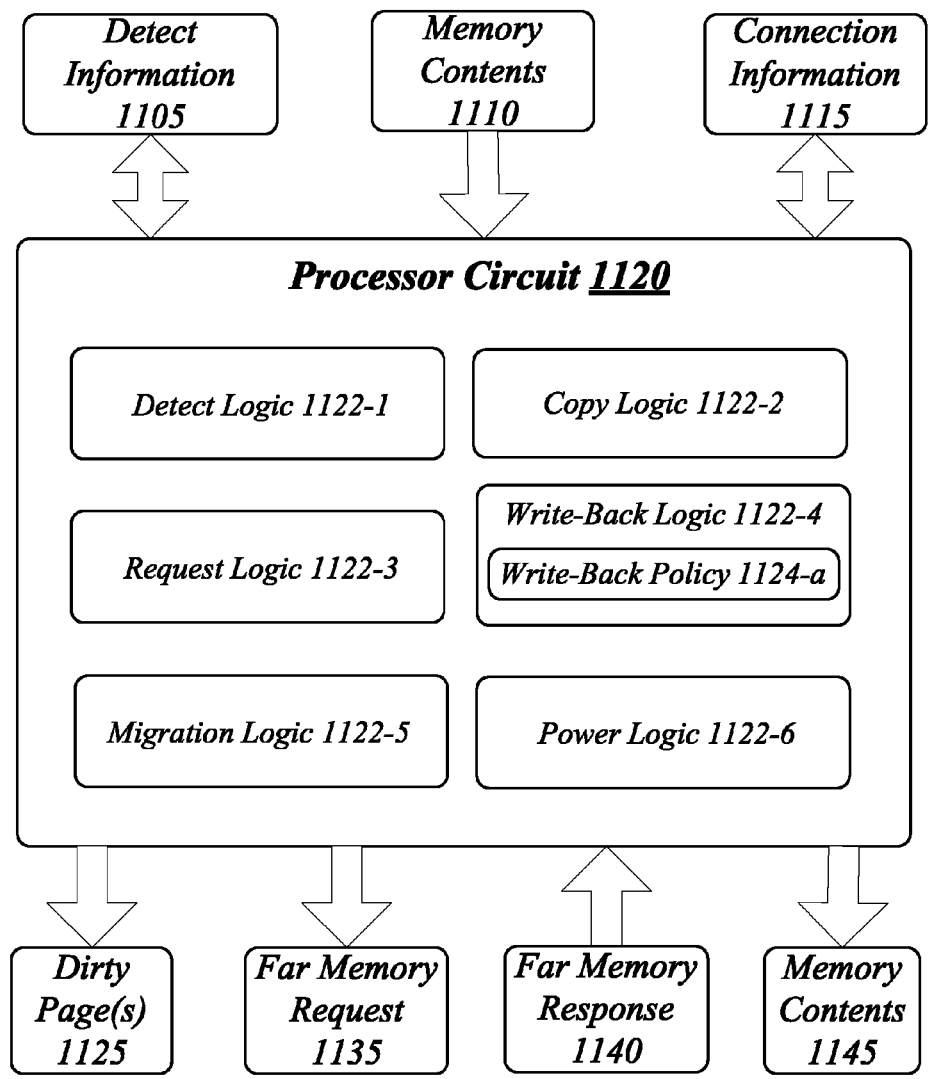
FIG. 11 illustrates an example block diagram for a second apparatus.

FIG. 10 illustrates an embodiment of a first storage medium. As shown in FIG. 10, the first storage medium includes a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context. FIG. 11 illustrates a block diagram for a second apparatus. As shown in FIG. 11, the second apparatus includes an apparatus 1100. Although apparatus 1100 shown in FIG. 11 has a limited number of elements in a certain topology or configuration, it may be appreciated that apparatus 1100 may include more or less elements in alternate configurations as desired for a given implementation.

The apparatus 1100 may include a component of a computing device that may be firmware implemented and have a processor circuit 1120 arranged to execute one or more logics 1122-a. Similar to apparatus 800 for FIG. 8, "a" and "b" and "c" and similar designators may be variables representing any positive integer.

According to some examples, apparatus 1100 may be part a first device (e.g. device 155, 255 or 355) having first circuitry capable of executing one or more applications using a 2LM architecture including a near memory and a far memory. The examples are not limited in this context.

In some examples, as shown in FIG. 11, apparatus 1100 includes processor circuit 1120. Processor circuit 1120 may be generally arranged to execute one or more logics 1122-a. Processor circuit 1120 can be any of various commercially available processors to include, but not limited to, those previously mentioned for processor circuit 820 for apparatus 800. Dual microprocessors, multi-core processors, and other multi-processor architectures may also be employed as processor circuit 1120. According to some examples processor circuit 1120 may also be an application specific integrated circuit (ASIC) and logics 1122-a may be implemented as hardware elements of the ASIC.

According to some examples, apparatus 1100 may include a detect logic 1122-1. Detect logic 1122-1 may be executed by processor circuit 1120 to detect an indication of a connection to a second near memory included in the 2LM architecture. The second near memory may be capable of being used by the one or more applications when executed by the second circuitry. For example, detect logic 1122-1 may receive detect information 1105 that may indicate the connection to the second circuitry via either a wired or wireless communication channel.

In some examples, apparatus 1100 may also include a copy logic 1122-2. Copy logic 1122-2 may be executed by processor circuit 1120 to receive, from the first far memory, a copy of memory contents 1110 sent from the second near memory used by the second circuitry to execute the one or more applications. Copy logic 1122-2 may store the copy of memory contents 1110 to the first near memory in a manner transparent to an OS. The copy of memory contents 1110 stored to the first near memory for use by the first circuitry to execute the one or more applications.

In some examples, apparatus 1100 may also include a request logic 1122-3. Request logic 1122-3 may be executed by processor circuit 1120 to receive a page miss indication for the first near memory. The page miss may be associated with data maintained in the first far memory. Responsive to the page miss request, logic 1122-3 may send a memory access request included in far memory request 1035 to the first far memory to obtain the data. Request logic 1122-3 may then receive the data from the first far memory in a far memory response included in far memory response 1140 and may then cause the copying of the received data to the first near memory. According to some examples, apparatus 1100 may also include a write-back logic 1122-4.

Write-back logic 1122-4 may be executed by processor circuit 1120 to send, from the first near memory, at least portions of memory content to the first far memory. The at least portions of memory content may include dirty page(s) 1125 that has one or more dirty pages generated during execution of the one or more applications by the first circuitry. For these examples, write-back logic 1122-4 may maintain write-back policy 1124-a, e.g., in a data structure such as a LUT. Write-back policy 1124-a may direct write-back logic 1122-4 to send dirty page(s) 1125 to the first far memory based on one or more of a first or a second threshold number of dirty pages maintained in the first near memory being exceeded or a threshold time via which dirty pages may be maintained in the first near memory being exceeded.

In some examples, write-back logic 1122-4 may also cause at least portions of memory content to be written back to at least the first far memory based on memory check-pointing. As mentioned above, memory checkpointing may be associated with a dynamic threshold number of dirty pages (e.g., $M_T$). Once the dynamic threshold number of dirty pages is exceeded, write-back logic 1122-4 may send dirty page(s) 1125 that may include one or more dirty pages.

In some examples, apparatus 1100 may also include a migration logic 1122-5. Migration logic 1122-5 may be executed by processor circuit 1120 to send a copy of memory contents 1145 from the first near memory to at least the first far memory to enable migration of at least a portion of the copy of memory contents 1145 to the second near memory. In some examples, the copy of memory contents 1145 may be sent in response to a detection of an undocking or an indication that the connection to the second device was about to be terminated. This information may be received in connection information 1115.

In some examples, apparatus 1100 may include a power logic 1122-6. Power logic 1122-6 may be executed by processor circuit 1120 to either power down or power up the first circuitry and the first near memory at the first device. For example, the first circuitry and the first near memory may be powered down to a lower power state following the sending of flushed context information and a copy of memory contents 1145 from the first near memory to the second device.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 12 illustrates an example of a second logic flow. As shown in FIG. 12, the second logic flow includes a logic flow 1200. Logic flow 1200 may be representative of some or all of the operations executed by one or more logic, features, or devices described herein, such as apparatus 1200. More particularly, logic flow 1200 may be implemented by detect logic 1122-1, copy logic 1122-2, request logic 1122-3, write-back logic 1122-4, migration logic 1122-5 or power logic 1122-6.

In the illustrated example shown in FIG. 12, logic flow 1200 at block 1202 may detect, at a first device having first circuitry, an indication that a second device having second circuitry has connected to the first device. The first and the second circuitry may each be capable of is executing one or more applications arranged to be executed using a 2LM architecture having a near memory and a far memory. For example, detect logic 1122-1 may detect the second device. In some examples, logic flow 1200 at block 1204 may receive, from a first far memory located at the second device, a copy of memory contents from a second near memory located at the second device, the memory contents used by the second circuitry to execute the one or more applications. For these examples, copy logic 1122-2 may receive the copy of memory contents. According to some examples, logic flow 1200 at block 1206 may store the copy of memory contents to a first near memory located at the first device in a manner transparent to an operating system for the first or the second device. The copy of memory contents may be stored to the first near memory for use by the first circuitry to execute the one or more applications. For these examples, copy logic 1122-2 may cause the copy of memory contents to be stored to the first near memory.

In some examples, logic flow 1200 at block 1208 may send from the first near memory, at least portions of memory content to the first far memory located at the second device. The at least portions of memory content may include one or more dirty pages generated during execution of the one or more applications by the first circuitry. For these examples, write-back logic 1122-4 may cause the at least portions of memory content to be sent to at least the first far memory.

In some examples, logic flow 1200 at block 1210 may receive a page miss indication for the first near memory. The page miss associated with data maintained in the first far memory. The logic flow at block 1212 may then send a memory access request to the second device to obtain the data maintained in the first far memory. The logic flow at block 1214 may then receive the data from the first far memory and the logic flow at block 1216 may store the data in the first near memory. For these examples, request logic 1122-3 may be capable of implementing blocks 1210 to 1216 of logic flow 1200.

FIG. 13 illustrates an embodiment of a second storage medium. As shown in FIG. 13, the second storage medium includes a storage medium 1300. Storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
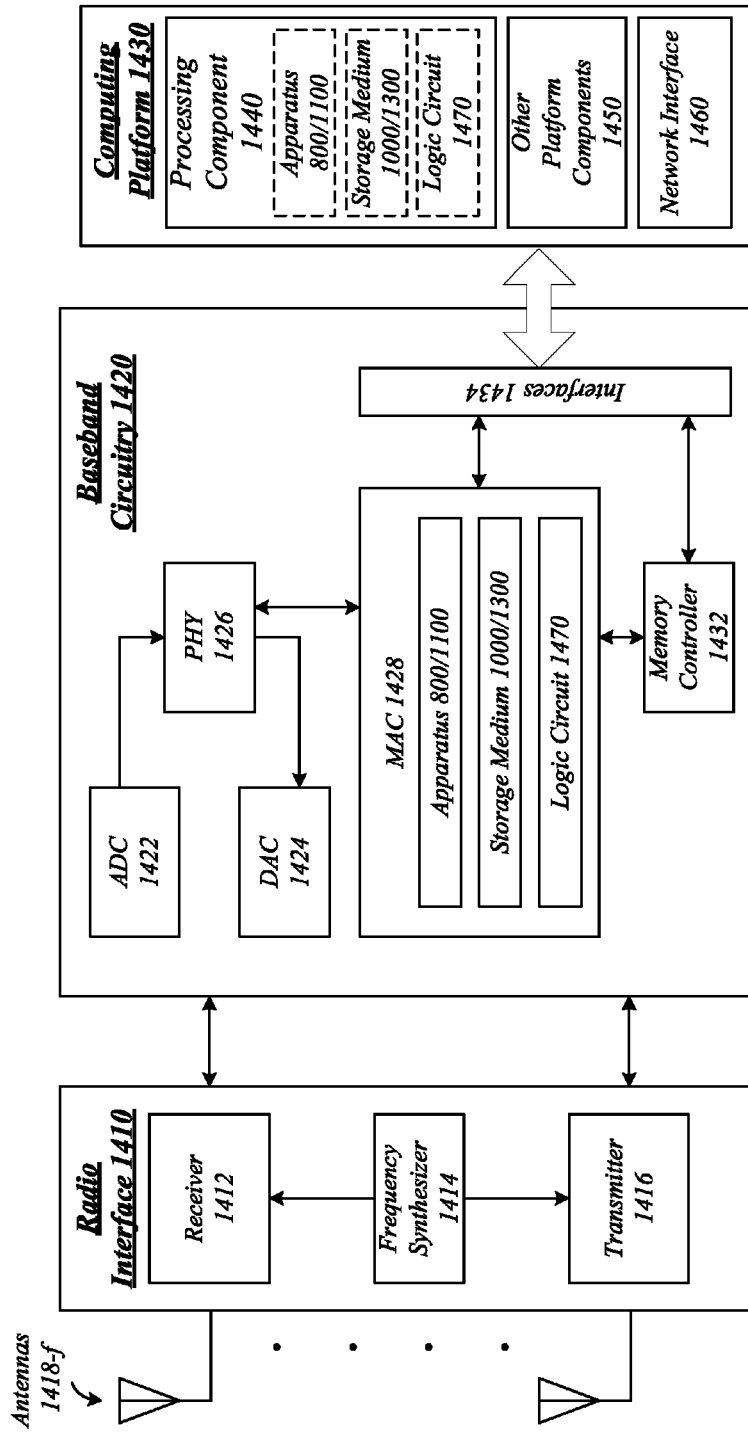
FIG. 14 illustrates an example of a device.

FIG. 14 illustrates an embodiment of a device 1400. In some examples, device 1400 may be configured or arranged for aggregating compute, memory and input/output (I/O) resources with another device. Device 1400 may implement, for example, apparatus 800/1100, storage medium 1000/1300 and/or a logic circuit 1470. The logic circuit 1470 may include physical circuits to perform operations described for apparatus 800/1100. As shown in FIG. 14, device 1400 may include a radio interface 1410, baseband circuitry 1420, and computing platform 1430, although examples are not limited to this configuration.

The device 1400 may implement some or all of the structure and/or operations for apparatus 800/1100, storage medium 1000/1300 and/or logic circuit 1470 in a single computing entity, such as entirely within a single device. The embodiments are not limited in this context. Radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418-*f*. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with MAC processing circuit 1428 and/or a computing platform 1430, for example, via one or more interfaces 1434.

In some embodiments, PHY processing circuit 1426 may include a frame construction and/or detection logic, in combination with additional circuitry such as a buffer memory, to construct and/or deconstruct communication frames (e.g., containing subframes). Alternatively or in addition, MAC processing circuit 1428 may share processing for certain of these functions or perform these processes independent of PHY processing circuit 1426. In some embodiments, MAC and PHY processing may be integrated into a single circuit.

Computing platform 1430 may provide computing functionality for device 1400. As shown, computing platform 1430 may include a processing component 1440. In addition to, or alternatively of, baseband circuitry 1420 of device 1400 may execute processing operations or logic for apparatus 800/1100, storage medium 1000/1300, and logic circuit 1470 using the processing component 1430. Processing component 1440 (and/or PHY 1426 and/or MAC 1428) may comprise various hardware elements, software elements, or a combination of both.

Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1430 may further include a network interface 1460. In some examples, network interface 1460 may include logic and/or features to support network interfaces operated in compliance with one or more wireless or wired technologies such as those described above for connecting to another device via a wired or wireless communication channel to establish an interconnect between the devices.

Device 1400 may be, for example, user equipment, a computer, a personal computer (PC), a desktop computer, a laptop computer, a notebook computer, a netbook computer, a tablet computer, an ultra-book computer, a smart phone, a wearable computing device, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1400 described herein, may be included or omitted in various embodiments of device 1400, as suitably desired.

Embodiments of device 1400 may be implemented using single input single output (SISO) architectures. However, certain implementations may include multiple antennas (e.g., antennas 1418-*f*) for transmission and/or reception using adaptive antenna techniques for beamforming or spatial division multiple access (SDMA) and/or using multiple input multiple output (MIMO) communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example first apparatus may include. The example first apparatus may also include first circuitry capable of executing one or more applications using a two-level memory (2LM) architecture including a first near memory and a first far memory. The example first apparatus may also include a detect logic to detect second circuitry capable of executing the one or more applications using the 2LM architecture that also includes a second near memory. The example first apparatus may also include a connect logic to cause a connection between the first far memory and the second near memory. The example first apparatus may also include a migration logic to utilize the first far memory to cause a copy of memory contents from the first near memory to migrate to the second near memory. The memory contents may be migrated in a manner transparent to an operating system.

According to some examples for the example first apparatus, the first circuitry, first near memory and first far memory may be located at a first device and the second circuitry and second near memory may be located at a second device.

In some examples for the example first apparatus, the first near memory may have a first memory capacity that is smaller than a second memory capacity of the second near memory. According to some examples, the example first apparatus may also include a power logic to power down the first circuitry and the first near memory to a lower power state following the migration of the copy of memory contents in the first near memory to the second near memory and cause continued power to the first far memory.

In some examples for the example first apparatus, the connect logic may receive an indication the connection between the first far memory and the second near memory is to be terminated. The power logic may then cause the first circuitry and the first near memory to power up the first circuitry and the first near memory to a higher power state. The migration logic may then receive a second copy of memory contents from the second near memory and cause the second copy of memory contents to be stored to the first far memory and at least a portion of the second copy of memory contents to be stored to the first near memory.

According to some examples for the example first apparatus, the migration logic may cause the at least a portion of the second copy of memory contents to be stored to the first near memory based on a memory paging policy to store memory pages previously stored in the second near memory and used by the one or more applications when executed by the second circuitry. The memory paging policy may include at least one of storing actively used memory pages, storing based on an age associated with the memory pages or storing based on an access pattern associated with the memory pages.

In some examples, the example first apparatus may also include a request logic to receive a memory access request to the first far memory based on a page miss to the second near memory and cause the memory access request to the first far memory to be fulfilled to provide data associated with the page miss to the second near memory.

According to some examples for the example first apparatus, the migration logic may receive at least portions of memory content from the second near memory. For these examples, the at least portions of memory content may include one or more dirty pages generated during execution of the one or more applications by the second circuitry. The migration logic may cause the one or more dirty pages to be stored to the first far memory.

In some examples for the example first apparatus, the migration logic may receive the at least portions of memory content based on a write-back policy that includes one or more of a first or a second threshold number of dirty pages maintained in the second near memory being exceeded or a threshold time via which dirty pages may be maintained in the second near memory being exceeded.

According to some examples for the example first apparatus, the migration logic may receive the at least portions of memory content based on memory checkpointing that includes a dynamic threshold number of dirty pages maintained in the second near memory being exceeded. For these examples, the dynamic threshold number may be based on available data bandwidth, observed latencies, or assigned power usage limits for migrating a second copy of memory contents between the first far memory and the second near memory via a wired interconnect or a wireless interconnect, the dynamic threshold number also based on memory controller write latency to the first far memory and memory controller read latency from the second near memory.

In some examples for the example first apparatus, the first device may include one or more of the first device having a lower thermal capacity for dissipating heat from the first circuitry compared to a higher thermal capacity for dissipating heat from the second circuitry at the second device, the first device operating on battery power or the first device having a lower current-carrying capacity for powering the first circuitry compared to a higher current-carrying capacity for powering the second circuitry at the second device.

In some examples, example first methods may include executing on first circuitry one or more applications. The first circuitry may be capable of executing the one or more applications using a two-level memory (2LM) architecture including a first near memory and a first far memory. The example first methods may also include detecting a second circuitry capable of executing the one or more applications using the 2LM architecture that also includes a second near memory. The example first methods may also include connecting the first far memory to the second near memory. The example first methods may also include utilizing the first far memory to migrate a copy of memory contents from the first near memory to the second near memory, the copy of memory contents migrated in a manner transparent to an operating system. According to some examples for the example first methods, the first circuitry, first near memory and first far memory may be located at a first device and the second circuitry and second near memory may be located at a second device.

In some examples for the example first methods, the first near memory may have a first memory capacity that is smaller than a second memory capacity of the second near memory.

According to some examples, the example first methods may also include powering down the first circuitry and the first near memory to a lower power state following the migration of the copy of memory contents in the first near memory to the second near memory. The example first methods may also include continuing to power the first far memory.

According to some examples, the example first methods may also include receiving, at the first far memory, a memory access request based on a page miss to the second near memory; and fulfilling the memory access request in order to provide data associated with the page miss.

In some examples for the example first methods, the second device may be detected responsive to the first device coupling to a wired interface that enables the first device to establish a wired communication channel to connect with the second device via a wired interconnect or responsive to the first device coming within a given physical proximity that enables the first device to establish a wireless communication channel to connect with the second device via a wireless interconnect.

According to some examples, the example first methods may also include receiving, at the first far memory, at least portions of memory content from the second near memory. For these examples, the at least portions of memory content may include one or more dirty pages generated during execution of the one or more applications by the second circuitry.

In some examples for the example first methods, receiving the at least portions of memory content may be based on a write-back policy that includes one or more of a first or a second threshold number of dirty pages maintained in the second near memory being exceeded or a threshold time via which dirty pages may be maintained in the second near memory being exceeded.

According to some examples for the example first methods, the first threshold number may be based on a memory capacity for the first near memory or respective data bandwidth and latencies for migrating a second copy of memory contents between the first far memory and the second near memory via a wired interconnect or a wireless interconnect.

In some examples for the example first methods, the second threshold number may be based on a data bandwidth capability for migrating a second copy of memory contents between the first far memory and the second near memory via a wired interconnect or a wireless interconnect, a time limit associated with disconnecting from the wired or wireless interconnect and a size associated with the one or more dirty pages generated during execution of the one or more applications by the second circuitry.

According to some examples for the example first methods, receiving the at least portions of memory content may be based on memory checkpointing that includes a dynamic threshold number of dirty pages maintained in the second near memory being exceeded, the dynamic threshold number based on available data bandwidth, observed latencies, or assigned power usage limits for migrating a second copy of memory contents between the first far memory and the second near memory via a wired interconnect or a wireless interconnect, the dynamic threshold number also based on memory controller write latency to the first far memory and memory controller read latency from the second near memory.

In some examples, the example first methods may also include receiving an indication that the connection to the second circuitry is to be terminated, powering up the first circuitry and the first far memory to a higher power state, receiving, at the first far memory, a migrated second copy of memory contents from the second near memory, storing at least a portion of the migrated second copy of memory contents from the second near memory to the first near memory and resuming execution of the one or more applications on the first circuitry.

According to some examples for the example first methods, storing the at least a portion of the second copy of memory contents may be based on a memory paging policy to store memory pages previously stored in the second near memory and used by the one or more applications when executed by the second circuitry, the memory paging policy including at least one of storing actively used memory pages, storing based on an age associated with the memory pages or storing based on an access pattern associated with the memory pages.

In some examples for the example first methods, the one or more applications may include one of at least a 4K resolution streaming video application, an application to present at least a 4K resolution image or graphic to a display, a gaming application including video or graphics having at least a 4K resolution when presented to a display, a video editing application or a touch screen application for user input to a display coupled to the second circuitry having touch input capabilities.

In some examples, an example first at least one machine readable medium comprising a plurality of instructions that in response to being executed on a first device having first circuitry may cause the first device to execute one or more applications, the first circuitry capable of executing the one or more applications using a two-level memory (2LM) architecture including a first near memory and a second far memory. The instructions may also cause the first device to detect a second circuitry capable of executing the one or more applications using the 2LM architecture that also includes a second near memory. The instructions may also cause the first device to connect the first far memory to the second near memory. The instructions may also cause the first device to utilize the first far memory to migrate a copy of memory contents from the first near memory to the second near memory. The copy of memory contents may be migrated in a manner transparent to an operating system.

According to some examples for the first at least one machine readable medium, the first circuitry, first near memory and first far memory located at the first device and the second circuitry and second near memory located at a second device.

In some examples for the first at least one machine readable medium, the first near memory may have a first memory capacity that is smaller than a second memory capacity of the second near memory.

According to some examples for the first at least one machine readable medium, the instructions may also cause the first device to power down the first circuitry and the first near memory to a lower power state following the migration of the copy of memory contents in the first near memory to the second near memory and continue to power the first far memory.

In some examples for the first at least one machine readable medium, the instructions may also cause the first device to receive a memory access request to the first far memory based on a page miss to the second near memory and fulfill the memory access request to the first far memory in order to provide data associated with the page miss.

According to some examples for the first at least one machine readable medium, the instructions may also cause the first device to detect the second circuitry responsive to the first device coupling to a wired interface that enables the first device to establish a wired communication channel to connect with a second device having the second circuitry via a wired interconnect or responsive to the first device coming within a given physical proximity that enables the first device to establish a wireless communication channel to connect with the second device via a wireless interconnect.

In some examples for the first at least one machine readable medium, the instructions may also cause the first device to receive at least portions of memory content from the second near memory, the at least portions of memory content including one or more dirty pages generated during execution of the one or more applications by the second circuitry and cause the received at least portions of memory content to be stored to the first far memory.

According to some examples for the first at least one machine readable medium, the instructions may also cause the first device to receive the at least portions of memory content based on a write-back policy that includes one or more of a first or a second threshold number of dirty pages maintained in the second near memory being exceeded or a threshold time via which dirty pages may be maintained in the second near memory being exceeded.

In some examples for the first at least one machine readable medium, the instructions may also cause the first device to receive the at least portions of memory content based on memory checkpointing that includes a dynamic threshold number of dirty pages maintained in the second near memory being exceeded, the dynamic threshold number based on available data bandwidth, observed latencies, or assigned power usage limits for migrating a second copy of memory contents between the first far memory and the second near memory via a wired interconnect or a wireless interconnect, the dynamic threshold number also based on memory controller write latency to the first far memory and memory controller read latency from the second near memory.

According to some examples for the first at least one machine readable medium, the instructions to also cause the first device to receive an indication that the connection to the second circuitry is to be terminated, power up the first circuitry and the first far memory to a higher power state, receive a migrated second copy of memory contents from the second near memory, cause the migrated second copy of memory contents to be stored to the first far memory and store at least a portion of the migrated second copy of memory contents to the first near memory for the resumption of execution of the one or more applications on the first circuitry.

In some examples for the first at least one machine readable medium, the instructions may also cause the first device to store the at least a portion of the migrated second copy of memory contents based on a memory paging policy to store memory pages previously stored in the second near memory and used by the one or more applications when executed by the second circuitry, the memory paging policy including at least one of storing actively used memory pages, storing based on an age associated with the memory pages or storing based on an access pattern associated with the memory pages.

In some examples, an example second apparatus may include first circuitry capable of executing one or more applications using a two-level memory (2LM) architecture including a first near memory and a first far memory. The example second apparatus may also include a detect logic to detect an indication of a connection to a second near memory included in the 2LM architecture. The second near memory may be capable of being used by the one or more applications when executed by second circuitry. The example second apparatus may also include a copy logic to receive, from the first far memory, a copy of memory contents sent from the second near memory used by the second circuitry to execute the one or more applications.

The copy logic may cause the copy of memory contents to be stored in the first near memory in a manner transparent to an operating system. The copy of memory contents may be stored to the first near memory for use by the first circuitry to execute the one or more applications.

According to some examples for the example second apparatus, the first near memory may have a first memory capacity that is larger than a second memory capacity of the second near memory. In some examples, the example second apparatus may also include a request logic to receive a page miss indication for the first near memory, the page miss associated with data maintained in the first far memory. For these examples, the request logic may send a memory access request to the first far memory to obtain the data, receive the data from the first far memory and cause the copying of the received data to the first near memory.

According to some examples for the example second apparatus, the first circuitry and first near memory may be located at a first device and the second circuitry, first far memory and second near memory may be located at a second device.

In some examples for the example second apparatus, the detect logic may detect the indication of the connection to the second near memory responsive to the first device coupling to a wired interface that enables the first device to establish a wired communication channel to connect with the second device via a wired interconnect or responsive to the first device coming within a given physical proximity that enables the first device to establish a wireless communication channel to connect with the second device via a wireless interconnect.

According to some examples, the example second apparatus may also include a write-back logic to send, from the first near memory, at least portions of memory content to the first far memory, the at least portions of memory content including one or more dirty pages generated during execution of the one or more applications by the first circuitry.

In some examples for the example second apparatus, the write-back logic may send the at least portions of memory content based on a write-back policy that includes one or more of a first or a second threshold number of dirty pages maintained in the first near memory being exceeded or a threshold time via which dirty pages may be maintained in the first near memory being exceeded.

According to some examples for the example second apparatus, the write-back logic may send the at least portions of memory content based on memory checkpointing that includes a dynamic threshold number of dirty pages maintained in the first near memory being exceeded, the dynamic threshold number based on available data bandwidth, observed latencies, or assigned power usage limits for migrating a second copy of memory contents between the first far memory and the first near memory via a wired interconnect or a wireless interconnect, the dynamic threshold number also based on memory controller write latency to the first far memory and memory controller read latency from the first near memory.

In some examples for the example second apparatus, the detect logic to receive an indication that the connection to the second near memory is to be terminated. The example second apparatus may also include a migration logic to send a second copy of memory contents from the first near memory to the first far memory to enable migration of at least a portion of the second copy of memory contents to the second near memory. The example second apparatus may also include a power logic to power down the first circuitry and the first near memory to a lower power state following the sending of the second copy of memory contents to the first far memory.

In some examples, example second methods may include detecting, at a first device having first circuitry, an indication that a second device having second circuitry has connected to the first device. For these examples, the first and the second circuitry may each be capable of executing one or more applications using a two-level memory (2LM) architecture having a near memory and a far memory. The example second methods may also include receiving, from a first far memory located at the second device, a copy of memory contents from a second near memory maintained at the second device. The memory contents may be used by the second circuitry to execute the one or more applications. The example second methods may also include storing the copy of memory contents to a first near memory located at the first device in a manner transparent to an operating system for the first or the second device. The copy of memory contents may be stored to the first near memory for use by the first circuitry to execute the one or more applications.

According to some examples for the example second methods, the first near memory may have a first memory capacity that is larger than a second memory capacity of the second near memory. In some examples, the example second methods may also include receiving a page miss indication for the first near memory. For these examples, the page miss associated with data maintained in the first far memory. The example second methods may also include sending a memory access request to the second device to obtain the data maintained in the first far memory, receiving the data from the first far memory and storing the data to the first near memory.

According to some examples, the example second methods may also include detecting the indication that the second device has connected responsive to the first device coupling to a wired interface that enables the first device to establish a wired communication channel to connect with the second device via a wired interconnect or responsive to the first device coming within a given physical proximity that enables the first device to establish a wireless communication channel to connect with the second device via a wireless interconnect.

In some examples, the example second methods may also include sending, from the first near memory, at least portions of memory content to the first far memory maintained at the second device. For these examples, the at least portions of memory content may include one or more dirty pages generated during execution of the one or more applications by the first circuitry. According to some examples for the example second methods, sending the at least portions of memory content may be based on a write-back policy that includes one or more of a first or a second threshold number of dirty pages maintained in the first near memory being exceeded or a threshold time via which dirty pages may be maintained in the first near memory being exceeded.

In some examples for the example second methods, the first threshold number may be based on a memory capacity for the second near memory or respective bandwidth and latencies for migrating a second copy of memory contents between the first far memory and the first near memory via the wired interconnect or the wireless interconnect.

According to some examples for the example second methods, the second threshold number may be based on a data bandwidth capability for migrating a second copy of memory contents between the first far memory and the first near memory via the wired interconnect or the wireless interconnect, a time limit associated with disconnecting the first device from the second device and a size associated with the one or more dirty pages generated during execution of the one or more applications by the first circuitry.

In some examples for the example second methods, sending the at least portions of memory content may be based on memory checkpointing that includes a dynamic threshold number of dirty pages maintained in the first near memory being exceeded, the dynamic threshold number based on available data bandwidth, observed latencies, or assigned power usage limits for migrating a second copy of memory contents between the first far memory and the first near memory via the wired interconnect or the wireless interconnect, the dynamic threshold number also based on memory controller write latency to the first far memory maintained at the second device and memory controller read latency from the first near memory maintained at the first device.

According to some examples, the example second methods may also include receiving an indication that the connection to the second device is to be terminated, sending a second copy of memory contents from the first near memory to the first far memory to enable migration of at least a portion of the second copy of memory contents to the second near memory, and powering down the first circuitry and the first near memory to a lower power state following the sending of the second copy of memory contents to the first far memory.

In some examples for the example second methods, executing at least the portion of the one or more applications may include one of causing at least a 4K resolution streaming video to be presented on a display coupled to the first device, causing at least a 4K resolution image or graphic to be presented on a display coupled to the first device or causing a touch screen to be presented on a display coupled to the first device, the display having touch input capabilities. In some examples, an example second at least one machine readable medium comprising a plurality of instructions that in response to being executed on a first device having first circuitry may cause the first device to detect an indication that a second device having second circuitry has connected to the first device. The first and the second circuitry may each be capable of executing one or more applications using a two-level memory (2LM) architecture having a near memory and a far memory. The instructions may also cause the first device to receive, from a first far memory located at the second device, a copy of memory contents from a second near memory located at the second device. The memory contents may be for use by the second circuitry to execute the one or more applications. The instructions may also cause the first device to store the copy of memory contents to a first near memory maintained at the first device in a manner transparent to an operating system for the first or the second device. The copy of memory contents stored to the first near memory for use by the first circuitry to execute the one or more applications.

According to some examples for the second at least one machine readable medium, the first near memory may have a first memory capacity that is larger than a second memory capacity of the second near memory.

In some examples for the second at least one machine readable medium, the instructions may also cause the first device to receive a page miss indication for the first near memory. The page miss may be associated with data maintained in the first far memory. The instructions may also cause the first device to send a memory access request to the second device to obtain the data maintained in the first far memory, receive the data from the first far memory and cause the storing of the data in the first near memory.

According to some examples for the second at least one machine readable medium, detection of the indication that the second device has connected may be responsive to the first device coupling to a wired interface that enables the first device to establish a wired communication channel to connect with the second device via a wired interconnect or responsive to the first device coming within a given physical proximity that enables the first device to establish a wireless communication channel to connect with the second device via a wireless interconnect. In some examples for the second at least one machine readable medium, the instructions may also cause the first device to send, from the first near memory, at least portions of memory content to the first far memory maintained at the second device, the at least portions of memory content including one or more dirty pages generated during execution of the one or more applications by the first circuitry.

According to some examples for the second at least one machine readable medium, the instruction may also cause the first device to send the at least portions of memory content based on a write-back policy that includes one or more of a first or a second or threshold number of dirty pages maintained in the first near memory being exceeded or a threshold time via which dirty pages may be maintained in the first near memory being exceeded.

In some examples for the second at least one machine readable medium, the instruction may also cause the first device to send the at least portions of memory content based on memory checkpointing that includes a dynamic threshold number of dirty pages maintained in the first near memory being exceeded, the dynamic threshold number based on available data bandwidth, observed latencies, or assigned power usage limits for migrating a second copy of memory contents between the first far memory and the first near memory via the wired interconnect or the wireless interconnect, the dynamic threshold number also based on memory controller write latency to the first far memory maintained at the second device and memory controller read latency from the first near memory maintained at the first device.

According to some examples for the second at least one machine readable medium, the instructions may also cause the first device to receive an indication that the connection to the second device is to be terminated, send a second copy of memory contents from the first near memory to the first far memory to enable migration of at least a portion of the second copy of memory contents to the second near memory and power down the first circuitry and the first near memory to a lower power state following the sending of the second copy of memory contents to the first far memory.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
   first circuitry capable of executing one or more applications using a two-level memory (2LM) architecture including a first memory and a second memory, the first memory having a latency that is lower than a latency of the second memory;
   a detect logic to detect second circuitry capable of executing the one or more applications using the 2LM architecture that also includes a third memory, the third memory having a latency that is lower than the latency of the second memory;
   a connect logic to cause a connection between the second memory and the third memory, the connect logic to receive an indication the connection between the second memory and the third memory is to be terminated;
   a migration logic to utilize the second memory to cause a copy of memory contents from the first memory to migrate to the third memory, the memory contents migrated in a manner transparent to an operating system, the migration logic to receive a second copy of memory contents from the third memory and cause the second copy of memory contents to be stored to the second memory and at least a portion of the second copy of memory contents to be stored to the first memory based on the indication the connection between the second memory and the third memory is to be terminated; and
   a power logic to power down the first circuitry and the first memory to a lower power state following the migration of the copy of memory contents in the first memory to the third-memory and cause continued power to the second memory, the power logic to cause the first circuitry and the first memory to power up the first circuitry and the first memory to a higher power state based on the indication the connection between the second memory and the third memory is to be terminated.

2. The apparatus of claim 1, comprising the first circuitry, first memory and second memory located at a first device and the second circuitry and third memory located at a second device.

3. The apparatus of claim 1, comprising the first memory having a first memory capacity that is smaller than a second memory capacity of the third memory.

4. The apparatus of claim 1, comprising the migration logic to cause the at least a portion of the second copy of memory contents to be stored to the first memory based on a memory paging policy to store memory pages previously stored in the third memory and used by the one or more applications when executed by the second circuitry, the memory paging policy to include at least one of storing actively used memory pages, storing based on an age associated with the memory pages or storing based on an access pattern associated with the memory pages.

5. The apparatus of claim 1, comprising:
   a request logic to receive a memory access request to the second memory based on a page miss to the third memory and cause the memory access request to the second memory to be fulfilled to provide data associated with the page miss to the third memory.

6. The apparatus of claim 1, comprising: the migration logic to receive at least portions of memory content from the third memory, the at least portions of memory content including one or more dirty pages generated during execution of the one or more applications by the second circuitry, the migration logic to cause the one or more dirty pages to be stored to the second memory.

7. The apparatus of claim 6, comprising the migration logic to receive the at least portions of memory content based on a write-back policy that includes one or more of a first or a second threshold number of dirty pages maintained in the third memory being exceeded or a threshold time via which dirty pages may be maintained in the third memory being exceeded.

8. The apparatus of claim 6, comprising the migration logic to receive the at least portions of memory content based on memory checkpointing that includes a dynamic threshold number of dirty pages maintained in the third memory being exceeded, the dynamic threshold number based on available data bandwidth, observed latencies, or assigned power usage limits for migrating a second copy of memory contents between the second memory and the third memory via a wired interconnect or a wireless interconnect, the dynamic threshold number also based on memory controller write latency to the second memory and memory controller read latency from the third memory.

9. The apparatus of claim 1, comprising:
   a request logic to receive a page miss indication for the first memory, the page miss associated with data maintained in the second memory, the request logic to:
   send a memory access request to the second memory to obtain the data;
   receive the data from the second memory; and
   cause the copying of the received data to the first memory.

10. The apparatus of claim 1, comprising:
    a write-back logic to send, from the first memory, at least portions of memory content to the second memory, the at least portions of memory content including one or more dirty pages generated during execution of the one or more applications by the first circuitry, the write-back logic to send the at least portions of memory content based on a write-back policy that includes one or more of a first or a second threshold number of dirty pages maintained in the first memory being exceeded or a threshold time via which dirty pages may be maintained in the first memory being exceeded.

11. A method comprising:
executing on first circuitry one or more applications, the first circuitry capable of executing the one or more applications using a two-level memory (2LM) architecture including a first memory and a second memory, the first memory having a latency that is lower than a latency of the second memory;
detecting a second circuitry capable of executing the one or more applications using the 2LM architecture that also includes a third memory, the third memory having a latency that is lower than the latency of the second memory;
connecting the second memory to the third memory;
utilizing the second memory to migrate a copy of memory contents from the first memory to the third memory, the copy of memory contents migrated in a manner transparent to an operating system;
powering down the first circuitry and the first memory to a lower power state following the migration of the copy of memory contents in the first memory to the third memory;
continuing to power the second memory;
receiving an indication the connection between the second memory and the third memory is to be terminated;
powering up the first circuitry and the first memory to a higher power state based on the indication the connection between the second memory and the third memory is to be terminated; and
receiving a second copy of memory contents from the third memory and causing the second copy of memory contents to be stored to the second memory and at least a portion of the second copy of memory contents to be stored to the first memory based on the indication the connection between the second memory and the third memory is to be terminated.

12. The method of claim 11, comprising the first circuitry, first memory and second memory located at a first device and the second circuitry and third memory located at a second device.

13. The method of claim 12, comprising detecting the second device responsive to the first device coupling to a wired interface that enables the first device to establish a wired communication channel to connect with the second device via a wired interconnect or responsive to the first device coming within a given physical proximity that enables the first device to establish a wireless communication channel to connect with the second device via a wireless interconnect.

14. The method of claim 11, comprising:
receiving, at the second memory maintained, at least portions of memory content from the third memory, the at least portions of memory content including one or more dirty pages generated during execution of the one or more applications by the second circuitry.

15. The method of claim 14, comprising receiving the at least portions of memory content based on a write-back policy that includes one or more of a first or a second threshold number of dirty pages maintained in the third memory being exceeded or a threshold time via which dirty pages may be maintained in the third memory being exceeded.

16. The method of claim 15, the first threshold number based on a memory capacity for the first memory or respective data bandwidth and latencies for migrating memory contents between the second memory and the third memory via a wired interconnect or a wireless interconnect.

17. The method of claim 15, comprising the second threshold number based at least on a data bandwidth capability for migrating memory contents between the second memory and the third memory via a wired interconnect or a wireless interconnect, and a size associated with the one or more dirty pages generated during execution of the one or more applications by the second circuitry.

18. The method of claim 14, comprising receiving the at least portions of memory content based on memory checkpointing that includes a dynamic threshold number of dirty pages maintained in the third memory being exceeded, the dynamic threshold number based on available data bandwidth, observed latencies, or assigned power usage limits for migrating memory contents between the second memory and the third memory via a wired interconnect or a wireless interconnect, the dynamic threshold number also based on memory controller write latency to the second memory and memory controller read latency from the third memory.

19. At least one non-transitory machine readable medium comprising a plurality of instructions that in response to being executed on a first device having first circuitry capable of executing the one or more applications using a two-level memory (2LM) architecture including a first memory and a second memory, the first memory having a latency that is lower than a latency of the second memory causes the first device to:
detect a second circuitry capable of executing the one or more applications using the 2LM architecture that also includes a third memory, the third memory having a latency that is lower than the latency of the second memory;
connect the second memory to the third memory;
utilize the second memory to migrate a copy of memory contents from the first memory to the third memory, the copy of memory contents migrated in a manner transparent to an operating system;
power down the first circuitry and the first memory to a lower power state following the migration of the copy of memory contents in the first memory to the third memory;
continue to power the second memory;
receive an indication the connection between the second memory and the third memory is to be terminated;
power up the first circuitry and the first memory to a higher power state based on the indication the connection between the second memory and the third memory is to be terminated; and
receive a second copy of memory contents from the third memory and causing the second copy of memory contents to be stored to the second memory and at least a portion of the second copy of memory contents to be stored to the first memory based on the indication the connection between the second memory and the third memory is to be terminated.

20. The at least one machine readable medium of claim 19, comprising the instructions to also cause the first device to:
receive a page miss indication for the first memory, the page miss associated with data maintained in the second memory;
send a memory access request to the second device to obtain the data maintained in the second memory;
receive the data from the second memory; and
cause the storing of the data in the first memory.

* * * * *